(12) United States Patent
Kang

(10) Patent No.: US 7,993,777 B2
(45) Date of Patent: Aug. 9, 2011

(54) LITHIUM SECONDARY BATTERY

(75) Inventor: Shin-Gun Kang, Youngin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1015 days.

(21) Appl. No.: 11/287,479

(22) Filed: Nov. 28, 2005

(65) Prior Publication Data

US 2006/0141355 A1    Jun. 29, 2006

(30) Foreign Application Priority Data

Nov. 29, 2004 (KR) .................. 10-2004-0098858
Mar. 9, 2005 (KR) .................. 10-2005-0019827
Mar. 9, 2005 (KR) .................. 10-2005-0019828

(51) Int. Cl.
*H01M 2/30* (2006.01)
*H01M 2/08* (2006.01)

(52) U.S. Cl. .................. 429/182; 429/175; 429/178

(58) Field of Classification Search .................. None
See application file for complete search history.

(56) References Cited

U.S. PATENT DOCUMENTS

| | | | |
|---|---|---|---|
| 5,663,013 A | 9/1997 | Narukawa et al. | |
| 6,509,115 B2 * | 1/2003 | Kim et al. | 429/175 |
| 6,610,444 B2 * | 8/2003 | Akita et al. | 429/181 |
| 2003/0194609 A1 | 10/2003 | Nam et al. | |

FOREIGN PATENT DOCUMENTS

| | | | |
|---|---|---|---|
| EP | 1 443 573 | 8/2004 | |
| JP | 09-147832 | 6/1997 | |
| JP | 09-213303 | 8/1997 | |
| JP | 2000-090912 | 3/2000 | |
| JP | 2000090912 A | * | 3/2000 |
| JP | 2001-196047 | 7/2001 | |
| JP | 2003-086151 | 3/2003 | |
| JP | 2004-158341 | 6/2004 | |
| JP | 2005-056649 | 3/2005 | |
| JP | 2005-093204 | 4/2005 | |
| KR | 2003066243 A | * | 8/2003 |
| KR | 1020030081938 | 10/2003 | |

OTHER PUBLICATIONS

European Office Action of the European Patent Application No. 05 11 1408, mailed on Feb. 10, 2006.
*Office action* from the Korean Intellectual Property Office issued in Applicant's corresponding Korean Patent Application Nos. 10-2005-0019827 and 10-2005-0019828 dated Jun. 19, 2006.

* cited by examiner

*Primary Examiner* — Keith Walker
(74) *Attorney, Agent, or Firm* — Robert E. Bushnell, Esq.

(57) ABSTRACT

A lithium secondary battery includes a fixing unit in a terminal plate to fix the terminal plate to an electrode terminal to prevent the terminal plate from rotating when an electrode tap is welded to a cap assembly or when the cap assembly is assembled with an upper portion of a can. The lithium secondary battery includes an electrode assembly having a first electrode plate, a second electrode plate and a separator, a can for receiving the electrode assembly and an electrolyte, and a cap assembly having a cap plate, an insulating plate, a terminal plate and an electrode terminal and being assembled with an upper opening of the can in order to seal the can. The terminal plate includes a fixing unit to fix the terminal plate to the electrode terminal such that the terminal plate is prevented from rotating. The terminal plate has a terminal hole into which the electrode terminal is inserted, and the fixing unit includes at least one recess formed at a lower surface of the terminal plate and connected to the terminal hole.

6 Claims, 17 Drawing Sheets

LITHIUM SECONDARY BATTERY

CLAIM OF PRIORITY

This application makes reference to, incorporates the same herein, and claims all benefits accruing under 35 U.S.C.§119 from three applications filed in the Korean Intellectual Property Office on 29 Nov. 2004 and on 9 Mar. 2005 and there duly respectively assigned Serial Nos. 10-2004-0098858, 10-2005-0019827, and 10-2005-0019828.

BACKGROUND OF THE INVENTION

1. Field of the Invention

The present invention relates to a lithium secondary battery. More particularly, the present invention relates to a lithium secondary battery, in which a fixing unit for fixing a terminal plate to an electrode terminal is provided in the terminal plate in order to prevent the terminal plate from rotating when an electrode tap is welded to a cap assembly or when the cap assembly is assembled with an upper portion of a can.

In addition, the present invention relates to a lithium secondary battery, in which an anti-rotation unit is provided in a cap plate to prevent an electrode terminal from rotating.

Furthermore, the present invention relates to a lithium secondary battery, in which an anti-rotation unit is provided in an electrode terminal to prevent the electrode terminal from rotating.

2. Description of the Related Art

Recently, light-weight portable wireless appliances, such as video cameras, potable phones and potable computers, have been fabricated with various functions, so studies have been actively performed in relation to secondary batteries used as power sources for these portable wireless appliances. For instance, the secondary batteries include Ni—Cd batteries, Ni-MH batteries, Ni—Zn batteries and lithium secondary batteries. Among other things, lithium secondary batteries are rechargeable batteries, which can be fabricated in a compact size with a high capacity. Lithium secondary batteries have a high operational voltage and high energy density per unit weight and accordingly, lithium secondary batteries are extensively used in advanced electronic technology fields.

A lithium secondary battery can be fabricated by accommodating an electrode assembly including a first electrode plate, a second electrode plate and a separator in a can together with an electrolyte, and then sealing an upper opening of the can by using a cap assembly. In general, the first electrode plate is a negative electrode plate and the second electrode plate is a positive electrode plate.

The cap assembly includes a cap plate, an insulating plate, a terminal plate and an electrode terminal. The cap assembly is accommodated in an insulating case and assembled with the upper opening of the can, thereby sealing the can.

The cap plate is made of a metal plate having a size and a shape corresponding to those of the upper opening of the can. The cap plate has a first terminal hole formed at the center thereof and the electrode terminal is inserted into the first terminal hole. When the electrode terminal is inserted into the first terminal hole, a gasket tube is provided around the electrode terminal in order to insulate the electrode terminal from the cap plate. In addition, an electrolyte injection hole is formed on one side of the cap plate. After the cap assembly has been assembled with the upper opening of the can, the electrolyte is injected into the can through the electrolyte injection hole. Then, the electrolyte injection hole is sealed by a plug.

The electrode terminal is connected to a first electrode tap of the first electrode plate or a second electrode tap of the second electrode plate so that the electrode terminal serves as either a negative electrode terminal or a positive electrode terminal.

The insulating plate is made of an insulating material identical to the material for the gasket tube and is attached the lower surface of the cap plate. The insulating plate has a second terminal hole, which is aligned to correspond to the first terminal hole of the cap plate and into which the electrode terminal is inserted. The insulating plate is formed on the lower surface thereof with a recess having a size and a shape corresponding to those of the terminal plate such that the terminal plate can be arranged in the recess.

The terminal plate is made of a Ni alloy and is attached to the lower surface of the insulating plate. The terminal plate is formed with a third terminal hole, which is aligned to correspond to the first terminal hole of the cap plate and into which the electrode terminal is inserted. Since the electrode terminal inserted into the first terminal hole of the cap plate is insulated from the terminal plate by the gasket tube, the terminal plate can be electrically connected to the electrode terminal while being electrically insulated from the cap plate.

After the electrode terminal has been inserted into the terminal plate, a pressing force is applied to the electrode terminal from a lower portion of the terminal plate in order to rivet the electrode terminal to the terminal plate. Since the electrode terminal is fixed, the terminal plate and the insulating plate are also fixed by the electrode terminal.

However, since the terminal plate and the insulating plate are fixed by the electrode terminal having a cylindrical structure, there is a possibility that the terminal plate and the insulating plate can rotate about the electrode terminal. In particular, if the fixing force of the electrode terminal is relatively small, the possibility may increase.

In addition, when the first electrode tap or the second electrode tap of the electrode assembly is welded to the terminal plate after the terminal plate has been assembled with the cap assembly, the terminal plate can rotate.

Furthermore, the terminal plate can rotate together with the insulating plate when cap assembly accommodated in the insulating case is assembled with the upper portion of the can.

If the first electrode tap of the lithium secondary battery is directly connected to a lower surface of the electrode terminal, the electrode terminal can rotate when it is assembled with the cap assembly. The electrode terminal can rotatably move the negative electrode tap electrically connected to the lower surface of the electrode terminal, thereby causing a short circuit between the can and the second electrode tap.

In addition, if the coupling force between the electrode terminal and the gasket tube or between the gasket tube and the terminal holes is insufficient, the cap assembly can rotate during the fabrication process for the secondary battery. The negative electrode tap electrically connected to the lower surface of the electrode terminal can rotatably move, thereby causing a short circuit with the can.

SUMMARY OF THE INVENTION

Accordingly, the present invention has been made to solve one or more of the above-mentioned problems, and an object of the present invention is to provide a lithium secondary battery, in which a fixing unit for fixing a terminal plate to an electrode terminal is provided in the terminal plate in order to prevent the terminal plate from rotating when an electrode tap is welded to a cap assembly or when the cap assembly is assembled with an upper portion of a can.

Another object of the present invention is to provide a lithium secondary battery, in which an anti-rotation unit is provided in a cap plate for preventing an electrode terminal from rotating.

Still another object of the present invention is to provide a lithium secondary battery, in which an anti-rotation unit is provided in an electrode plate for preventing the electrode terminal from rotating.

In order to accomplish the above objects, according to one aspect of the present invention, a lithium secondary battery is provided including: an electrode assembly including a first electrode plate, a second electrode plate and a separator; a can adapted to receive the electrode assembly and an electrolyte; and a cap assembly including a cap plate, an insulating plate, a terminal plate and an electrode terminal, the cap assembly adapted to being assembled with an upper opening of the can to seal the can. The terminal plate includes a fixing unit adapted to fix the terminal plate to the electrode terminal to prevent the terminal plate from being rotated.

The terminal plate preferably includes a terminal hole adapted to receive the electrode terminal and wherein the fixing unit includes at least one recess arranged on a lower surface of the terminal plate and connected to the terminal hole.

The at least one recess of the fixing unit preferably has a triangular, rectangular or arcuate sectional shape. The at least one recess of the fixing unit preferably has a planar bottom surface. A depth of the at least one recess of the fixing unit is preferably less than 50% of a thickness of the terminal plate. The at least one recess of the fixing unit is preferably inclined from the lower surface of the terminal plate toward the terminal hole. A portion of the at least one recess contacting the terminal hole preferably has a depth of less than 50% of a thickness of the terminal plate.

The fixing unit preferably includes two recesses spaced apart from each other by an angle of 180° about the terminal hole. The fixing unit alternatively preferably includes four recesses spaced apart from each other by an angle of 90° about the terminal hole.

The terminal plate preferably includes a terminal hole adapted to receive the electrode terminal and wherein the fixing unit includes at least one hole arranged on a lower surface of the terminal plate and connected to the terminal hole. The at least one hole of the fixing unit preferably has a triangular, rectangular or arcuate sectional shape. The fixing unit preferably includes two holes spaced apart from each other by an angle of 180° about the terminal hole.

The first electrode plate is preferably a negative electrode plate, the second electrode plate is a positive electrode plate and the electrode terminal is a negative electrode terminal.

In order to accomplish the above objects, according to another aspect of the present invention, a lithium secondary battery is provided including: a jelly-roll type electrode assembly including a first electrode plate, a second electrode plate and a separator interposed between the first and second electrode plates; a case including a cavity adapted to receive the electrode assembly therein; and a cap assembly including a cap plate including a terminal hole and an anti-rotation unit, an electrode terminal received within the terminal hole, and a gasket surrounding the electrode terminal and adapted to insulate the electrode terminal from the cap plate.

The anti-rotation unit preferably includes at least one protrusion, which protrudes radially inward from a sidewall of the terminal hole. A length of the protrusion is preferably less than or equal to 0.2 mm. The protrusion preferably has a triangular, rectangular or semi-circular sectional shape. The anti-rotation unit preferably includes at least one recess, which is arranged radially outward from a sidewall of the terminal hole. A depth of the recess is preferably less than or equal to 0.2 mm. The recess preferably has a triangular, rectangular or semi-circular sectional shape.

In order to accomplish the above objects, according to still another aspect of the present invention, a lithium secondary battery is provided including: a jelly-roll type electrode assembly including a first electrode plate, a second electrode plate and a separator interposed between the first and second electrode plates; a case including a cavity adapted to receive the electrode assembly therein; and a cap assembly including a cap plate having a terminal hole, an electrode terminal having an anti-rotation unit and received within the terminal hole, and a gasket surrounding the electrode terminal and adapted to insulate the electrode terminal from the cap plate.

The anti-rotation unit preferably includes at least one protrusion arranged on an outer wall of the electrode terminal. A length of the protrusion is preferably less than or equal to 0.2 mm. The protrusion preferably has a triangular, rectangular or semi-circular sectional shape. The anti-rotation unit preferably includes at least one recess arranged on an outer wall of the electrode terminal. A depth of the recess is preferably less than or equal to 0.2 mm. The recess preferably has a triangular, rectangular or semi-circular sectional shape.

In order to accomplish the above objects, according to yet another aspect of the present invention, a lithium secondary battery is provided including: a jelly-roll type electrode assembly including a first electrode plate, a second electrode plate and a separator interposed between the first and second electrode plates; a case including a cavity adapted to receive the electrode assembly therein; and a cap assembly including a cap plate having a terminal hole and a first anti-rotation unit, an electrode terminal having a second anti-rotation unit and received within the terminal hole, and a gasket surrounding the electrode terminal and adapted to insulate the electrode terminal from the cap plate.

The first anti-rotation unit preferably includes at least one protrusion, which protrudes radially inward from an outer peripheral portion of the terminal hole, or at least one recess, which is arranged on the outer peripheral portion of the terminal hole; and the second anti-rotation unit preferably includes at least one protrusion arranged on an outer wall of the electrode terminal or at least one recess, which is arranged on the outer wall of the electrode terminal. The first and second anti-rotation units each preferably include protrusions. The first and second anti-rotation units alternatively each preferably include recesses. One of the first and second anti-rotation units preferably includes a protrusion and a remaining one of the first and second anti-rotation units preferably includes a recess. A depth of the recess or a length of the protrusion is preferably less than or equal to 0.2 mm. The first and second anti-rotation units preferably have triangular, rectangular or semi-circular sectional shapes.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein:

FIG. 3b is a sectional view taken along line A-A of FIG. 3a;

FIG. 4b is a sectional view taken along line B-B of FIG. 4a;

FIG. 8b is a sectional view taken along line C-C of FIG. 8a;

DETAILED DESCRIPTION OF THE INVENTION

Figure 1:
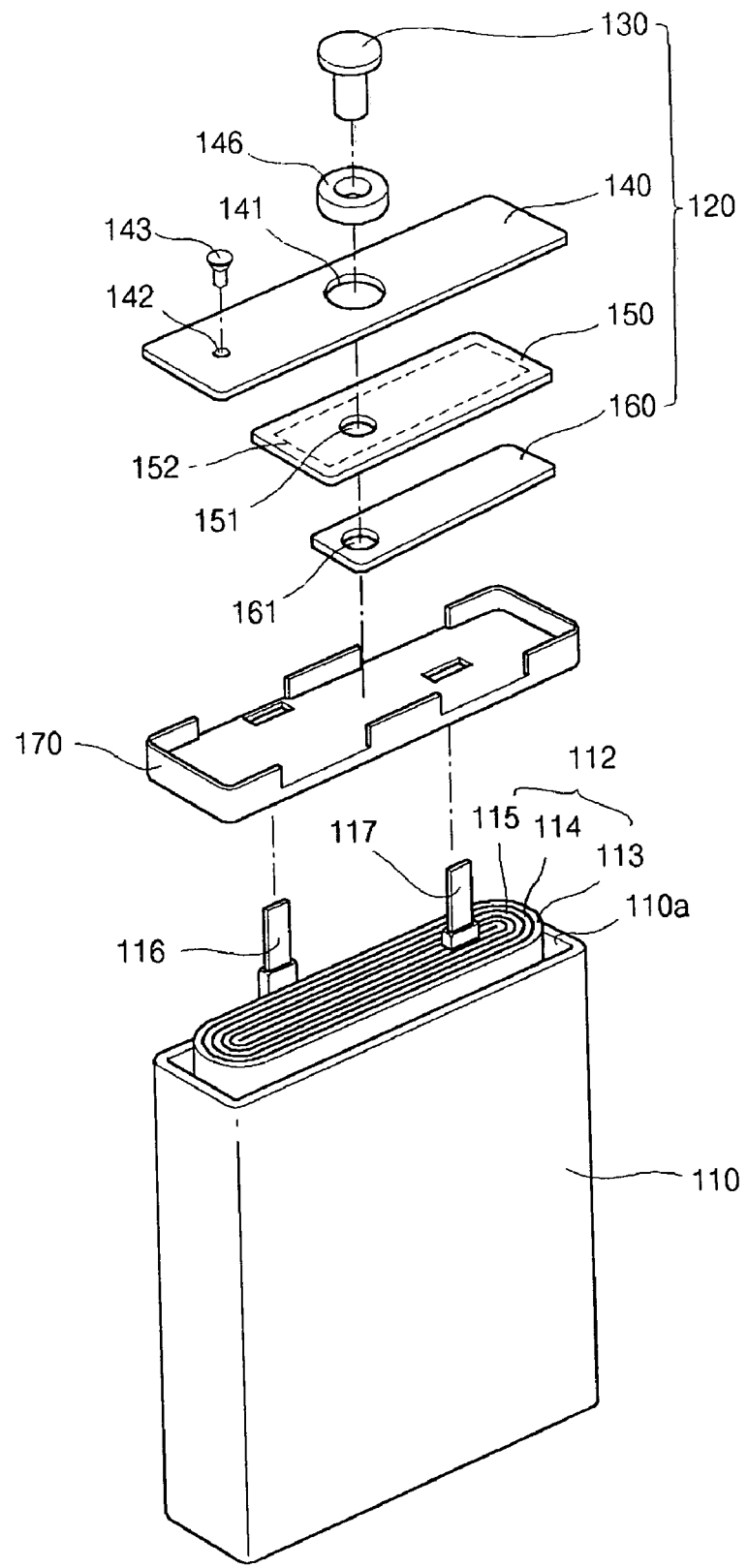
FIG. 1 is an exploded perspective view of a lithium secondary battery.

FIG. 1 is an exploded perspective view of a lithium secondary battery.

The lithium secondary battery can be fabricated by accommodating an electrode assembly 112 including a first electrode plate 115, a second electrode plate 113 and a separator 114 in a can 110 together with an electrolyte, and then sealing an upper opening 110a of the can 110 by using a cap assembly 120. In general, the first electrode plate 115 is a negative electrode plate and the second electrode plate 113 is a positive electrode plate.

The cap assembly 120 includes a cap plate 140, an insulating plate 150, a terminal plate 160 and an electrode terminal 130. The cap assembly 120 is accommodated in an insulating case 170 and assembled with the upper opening 110a of the can 110, thereby sealing the can 110.

The cap plate 140 is made of a metal plate having a size and a shape corresponding to those of the upper opening 110a of the can 110. The cap plate 140 has a first terminal hole 141 formed at the center thereof and the electrode terminal 130 is inserted into the first terminal hole 141. When the electrode terminal 130 is inserted into the first terminal hole 141, a gasket tube 146 is provided around the electrode terminal 130 in order to insulate the electrode terminal 130 from the cap plate 140. In addition, an electrolyte injection hole 142 is formed on one side of the cap plate 140. After the cap assembly 120 has been assembled with the upper opening 110a of the can 110, the electrolyte is injected into the can 110 through the electrolyte injection hole 142. Then, the electrolyte injection hole 142 is sealed by a plug 143.

The electrode terminal 130 is connected to a first electrode tap 117 of the first electrode plate 115 or a second electrode tap 116 of the second electrode plate 113 so that the electrode terminal 130 serves as either a negative electrode terminal or a positive electrode terminal.

The insulating plate 150 is made of an insulating material identical to the material for the gasket tube and is attached the lower surface of the cap plate 140. The insulating plate 150 has a second terminal hole 151, which is aligned to correspond to the first terminal hole 141 of the cap plate 140 and into which the electrode terminal 130 is inserted. The insulating plate 150 is formed on the lower surface thereof with a recess 152 having a size and a shape corresponding to those of the terminal plate 160 such that the terminal plate 160 can be arranged in the recess 152.

The terminal plate 160 is made of a Ni alloy and is attached to the lower surface of the insulating plate 150. The terminal plate 160 is formed with a third terminal hole 161, which is aligned to correspond to the first terminal hole 141 of the cap plate 140 and into which the electrode terminal 130 is inserted. Since the electrode terminal 130 inserted into the first terminal hole 141 of the cap plate 140 is insulated from the terminal plate 140 by the gasket tube 146, the terminal plate 160 can be electrically connected to the electrode terminal 130 while being electrically insulated from the cap plate 140.

After the electrode terminal 130 has been inserted into the terminal plate 160, a pressing force is applied to the electrode terminal 130 from a lower portion of the terminal plate 160 in order to rivet the electrode terminal 130 to the terminal plate 160. Since the electrode terminal 130 is fixed, the terminal plate 160 and the insulating plate 150 are also fixed by the electrode terminal 130.

However, since the terminal plate 160 and the insulating plate 150 are fixed by the electrode terminal 130 having a cylindrical structure, there is a possibility that the terminal plate 160 and the insulating plate 150 can rotate about the electrode terminal 130. In particular, if the fixing force of the electrode terminal 130 is relatively small, the possibility may increase.

In addition, when the first electrode tap 217 or the second electrode tap 216 of the electrode assembly 212 is welded to the terminal plate 160 after the terminal plate 160 has been assembled with the cap assembly 220, the terminal plate 160 can rotate.

Furthermore, the terminal plate 160 can rotate together with the insulating plate 150 when cap assembly 120 accommodated in the insulating case 170 is assembled with the upper portion of the can 110.

Hereinafter, exemplary embodiments of the present invention are described with reference to the accompanying drawings. In the following description and drawings, the same reference numerals are used to designate the same or similar components, and accordingly, a repetition of the description of the same or similar components has been omitted.

Figure 2:
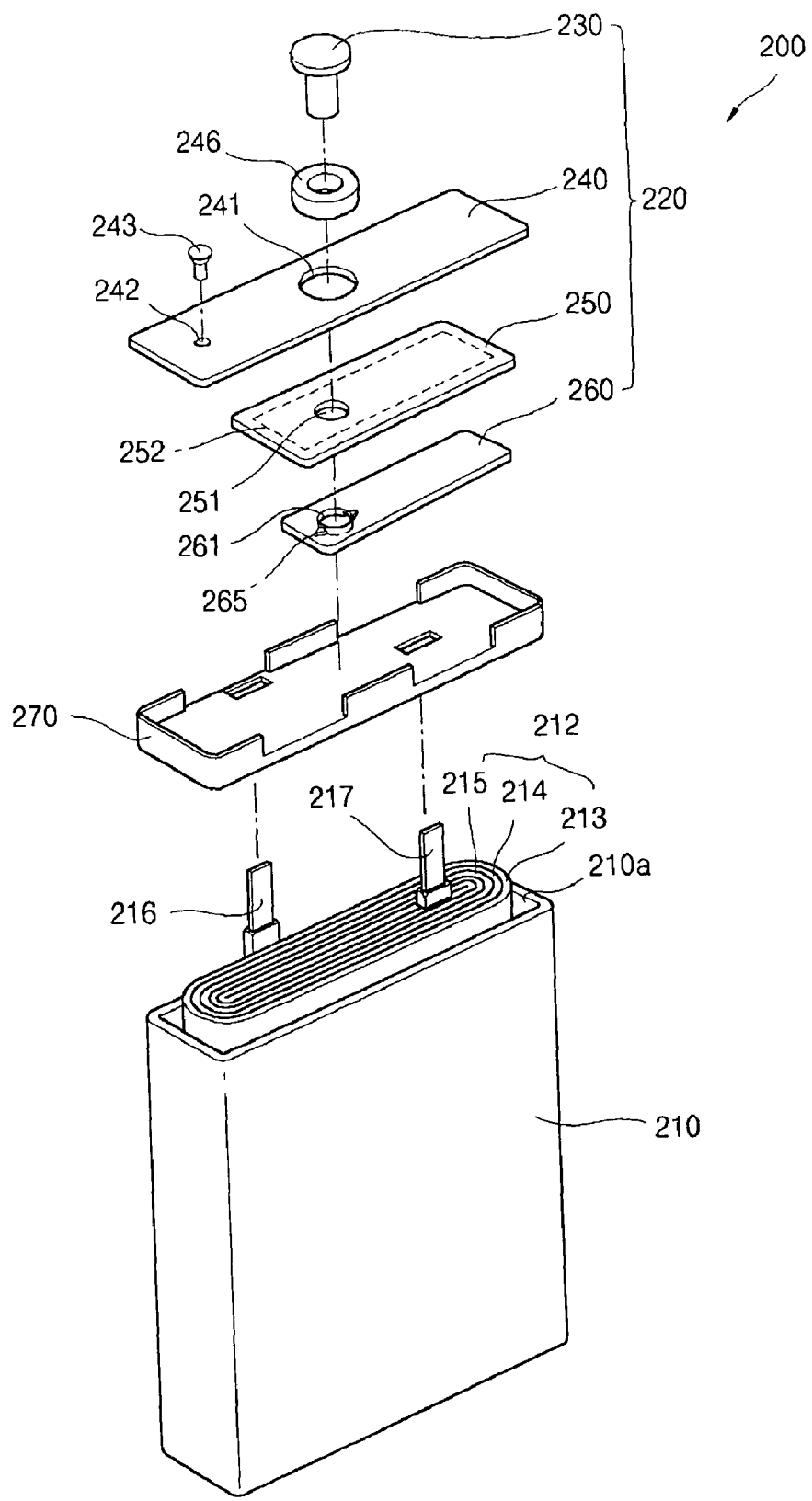
FIG. 2 is an exploded perspective view of a lithium secondary battery according to one embodiment of the present invention.
Figure 3A:
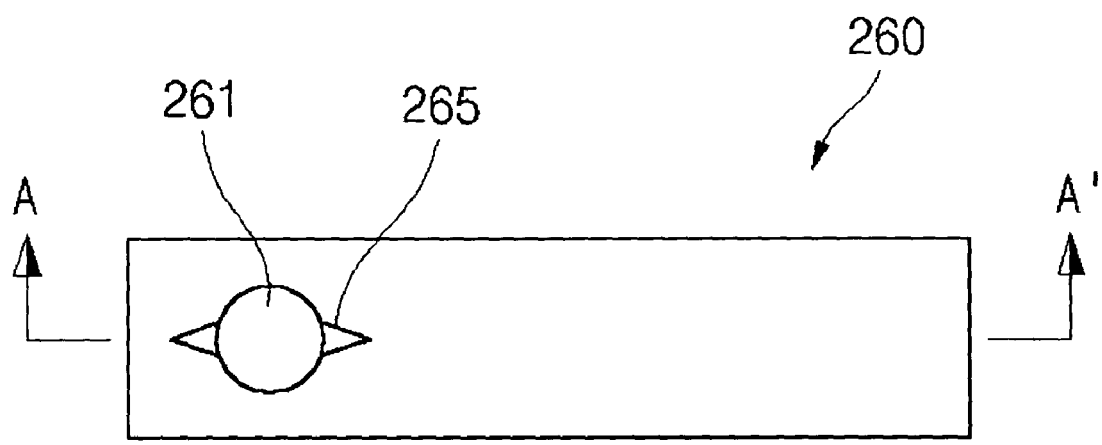
FIG. 3a is a bottom view of a terminal plate according to one embodiment of the present invention.
Figure 3B:
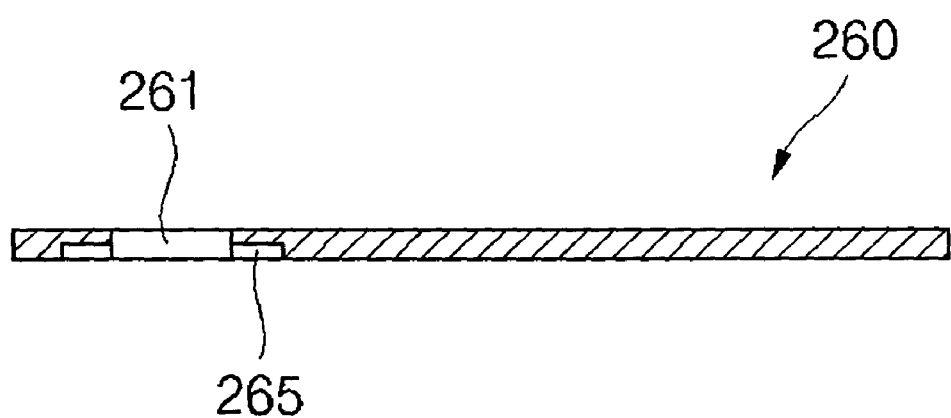

FIG. 2 is an exploded perspective view of a lithium secondary battery according to one embodiment of the present invention, FIG. 3a is a bottom view of a terminal plate according to one embodiment of the present invention, and FIG. 3b is a sectional view taken along line A-A of FIG. 3a.

Referring to FIG. 2, the lithium secondary battery 200 according to the present invention includes a can 210, an electrode assembly 212 accommodated in the can 210, and a cap assembly 220 assembled with an upper end portion of the can 210 in order to seal an upper opening 210a of the can 210.

The can 210 is made of a metal having a box shape and serves as a terminal. Preferably, the can 210 is made of a light weight aluminum or an aluminum alloy. The can 210 is formed at an upper end thereof with the upper opening 210a and the electrode assembly 212 is accommodated in the can 210 through the upper opening 210a.

The electrode assembly 212 includes a second electrode plate 213, a first electrode plate 215 and a separator 214. The first and second electrode plates 215 and 213 are stacked by interposing the separator 214 therebetween and then wound in the form of a jellyroll. A second electrode tap 216 is welded to the second electrode plate 213 and an end portion of the second electrode tap 216 protrudes upward from the electrode assembly 212. A first electrode tap 217 is welded to the first electrode plate 215 and an end portion of the first electrode tap 217 protrudes upward from the electrode assembly 212. In general, the first electrode plate 215 serves as a negative electrode plate, and the second electrode plate 213 serves as a positive electrode plate. However, it is also possible to form the first electrode plate as the positive electrode plate, while forming the second electrode plate as the negative electrode plate.

The cap assembly 220 includes a cap plate 240, an insulating plate 250, a terminal plate 260 and an electrode terminal 230. The cap assembly 220 is accommodated in an insulating case 270 and attached to the upper opening 210a of the can 210 so as to seal the can 210. The structure of the cap assembly described below is only for illustrative purposes and the cap assembly can be formed with various structures.

The cap plate 240 is made of a metal plate having a size and a shape corresponding to those of the upper opening 210a of the can 210. The cap plate 240 has a first terminal hole 241 formed at the center thereof and the electrode terminal 230 is inserted into the first terminal hole 241. A gasket tube 246 is provided in the first terminal hole 241 so as to insulate the electrode terminal 230 from the cap plate 240.

An electrolyte injection hole 242 is formed on one side of the cap plate 240. After the cap assembly 220 has been assembled with the upper opening 210a of the can 210, the electrolyte is injected into the can 210 through the electrolyte injection hole 242. Then, the electrolyte injection hole 242 is sealed by a plug 243. The plug 243 can have a plate shape. In this case, the plate-shaped plug 243 is welded to the cap plate 240 so as to seal the electrolyte injection hole 242. However, the present invention does not limit the shape of the plug 243.

The insulating plate 250 is made of an insulating material identical to the material for the gasket tube and is attached to the lower surface of the cap plate 240. The insulating plate 250 includes a second terminal hole 251 and a recess 252. When the insulating plate 250 is attached to the cap plate 240, the second terminal hole 251 is aligned to correspond to the first terminal hole 241 of the cap plate 240 in such a manner that the electrode terminal 230 can be inserted into the second terminal hole 251 through the first terminal hole 241. The recess 252 is formed on the lower surface of the insulating plate 250 with a size and a shape corresponding to those of the terminal plate 260. Preferably, the recess 252 has a depth less than the thickness of the terminal plate 260. The recess 252 fixes the terminal plate 260 such that the terminal plate 260 can not move relative to the insulating plate 250. The recess 252 can be formed with various shapes corresponding to the shapes of the terminal plate 260.

The terminal plate 260 is made of a conductive metal, such as a plate-shaped Ni alloy. The terminal plate 260 is fixedly accommodated in the recess 252 formed in the lower surface of the insulating plate 250. Accordingly, the terminal plate 260 is attached to the insulating plate 250 and moves together with the insulating plate 250. The terminal plate 260 is formed with a third terminal hole 261, which is aligned to correspond to the first terminal hole 241 of the cap plate 240 and into which the electrode terminal 230 is inserted. The terminal plate 260 is electrically connected to the electrode terminal 230 while being electrically insulated from the cap plate 240 by the insulating plate 250.

Referring to FIGS. 3a and 3b, the terminal plate 260 has a fixing unit 265 connected to the third terminal hole 261 for fixing the terminal plate 260 to the electrode terminal 230 in order to prevent the terminal plate 260 from rotating. In more detail, the fixing unit 265 includes at least one recess having a predetermined depth, which is formed in the lower surface of the terminal plate 260 and connected to the third terminal hole 261. Preferably, the fixing unit 265 includes two recesses symmetrically formed in the lower surface of the terminal plate 260 about the third terminal hole 261 while being spaced apart from each other at an angle of 180°. Thus, when the electrode terminal 230, which extend downward by passing through the first to third terminal holes 241, 251 and 261 of the cap assembly 220, is riveted to the terminal plate 260 from the lower portion of the terminal plate 260, a part of a lower end portion of the electrode terminal 230 is accommodated within the fixing unit 265, thereby fixing the electrode terminal 230 to the terminal plate 260. The recess forming the fixing unit 265 includes a triangular recess having a planar bottom surface, in which the depth of the triangular recess is preferably within 50% of the thickness of the terminal plate 260. If the depth of the fixing unit 265 is larger than 50% of the thickness of the terminal plate 260, the lower surface of the fixing unit 265 (triangular recess) is damaged during the riveting process for the electrode terminal 230 so that the insulating plate 250 making contact with the upper surface of the terminal plate 260 can be damaged.

The electrode terminal 230 is sequentially inserted into the first, second and third terminal holes 241, 251 and 261 respectively formed in the cap plate 240, the insulating plate 250 and the terminal plate 260. In addition, the electrode terminal 230 is electrically connected to the first electrode tap 217 of the electrode assembly 212 through the terminal plate 260. When the electrode terminal 230 is inserted into the first terminal hole 241 of the cap plate 240, the electrode terminal 230 is electrically insulated from the cap plate 240 by the gasket tube 246. It is also possible to allow the electrode terminal 230 to be electrically connected to the second electrode tap 216 depending on the type of the electrode assembly 212. In general, the electrode terminal 230 serves as a negative electrode terminal. In addition, the first electrode tap 217 can serve as a negative electrode tap and the second electrode tap 216 can serve as a positive electrode tap. However, this can be reversed according to the structure of the secondary battery.

Figure 4A:
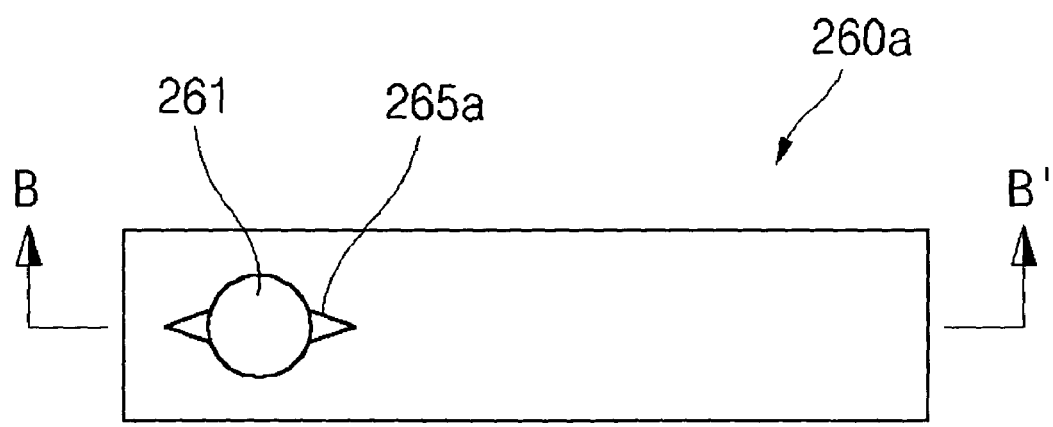
FIG. 4a is a bottom view of a terminal plate according to another embodiment of the present invention.
Figure 4B:
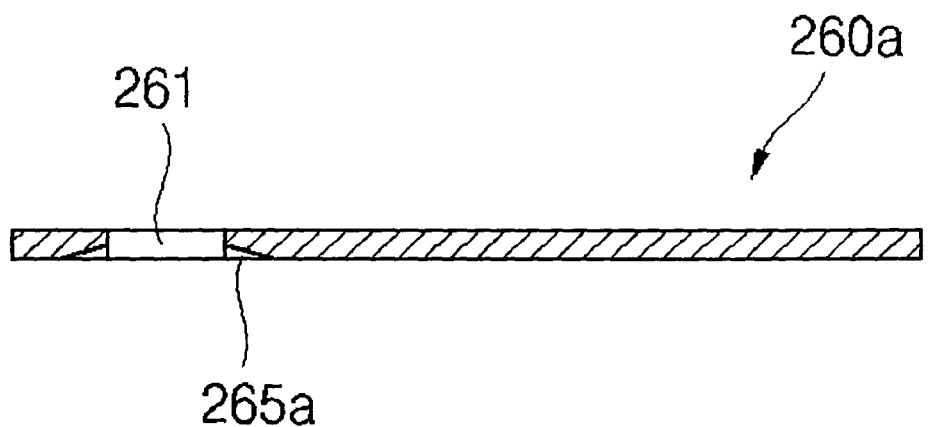

FIGS. 4a and 4b are bottom and sectional views of a terminal plate according to another embodiment of the present invention.

Referring to FIGS. 4a and 4b, the terminal plate 260a according to another embodiment of the present invention has a fixing unit 265a connected to the third terminal hole 261. In more detail, the fixing unit 265a includes at least one recess, which is formed in the lower surface of the terminal plate 260a and connected to the third terminal hole 261. Preferably, the fixing unit 265 includes two recesses symmetrically formed in the lower surface of the terminal plate 260a about the third terminal hole 261 while being spaced apart from each other at an angle of 180°. The recess forming the fixing unit 265a includes a triangular recess having a planar bottom surface and being inclined toward the third terminal hole 261 from the lower surface of the terminal plate 260a, in which a predetermined portion of the triangular recess connected to the third terminal hole 261 has a depth within 50% of the thickness of the terminal plate 260a. If the depth of the fixing unit 265a is greater than 50% of the thickness of the terminal plate 260a, the lower surface of the fixing unit 265a is damaged during the riveting process for the electrode terminal 230 so that the insulating plate 250 making contact with the upper surface of the terminal plate 260a can be damaged.

Figure 5:
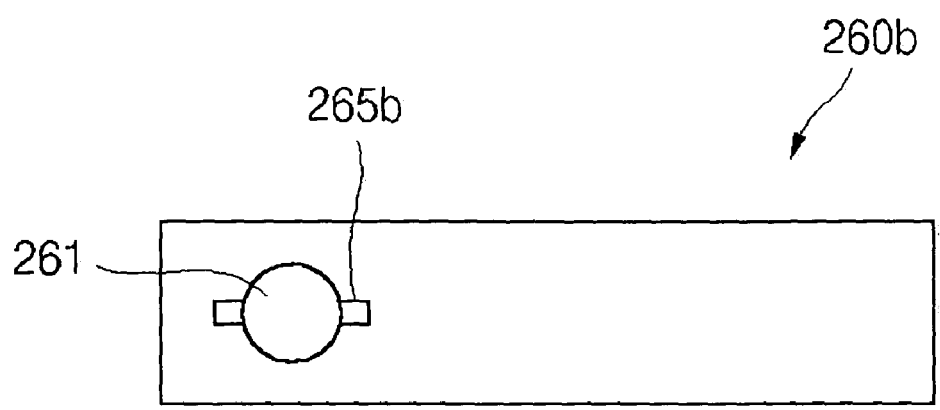
FIG. 5 is a bottom view of a terminal plate according to still another embodiment of the present invention.

FIG. 5 is a bottom view of a terminal plate according to still another embodiment of the present invention. The terminal plate of FIG. 5 is similar to the terminal plate of FIG. 3a and accordingly, the following description is focused only on the different parts therebetween.

Referring to FIG. 5, the terminal plate 260b according to still another embodiment of the present invention has a fixing unit 265b connected to the third terminal hole 261. In more detail, the fixing unit 265b includes at least one rectangular recess, which is formed in the lower surface of the terminal plate 260b and connected to the third terminal hole 261. Preferably, the fixing unit 265b includes two rectangular recesses symmetrically formed in the lower surface of the terminal plate 260b about the third terminal hole 261 while being spaced apart from each other at an angle of 180°. The depth of the rectangular recess is within 50% of the thickness of the terminal plate 260b. A bottom surface of the rectangular recess forming the fixing unit 265b is inclined toward the third terminal hole 261 or is formed as a planar surface.

Figure 6:
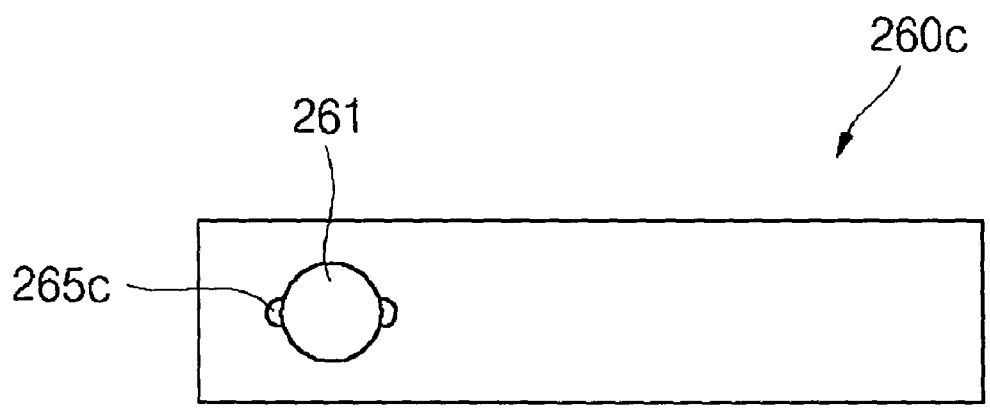
FIG. 6 is a bottom view of a terminal plate according to yet another embodiment of the present invention.

FIG. 6 is a bottom view of a terminal plate according to still yet another embodiment of the present invention. The terminal plate of FIG. 6 is similar to the terminal plate of FIG. 3a and accordingly, the following description is focused only on the different parts therebetween.

Referring to FIG. 6, the terminal plate 260c according to still yet another embodiment of the present invention has a fixing unit 265c connected to the third terminal hole 261. In more detail, the fixing unit 265c includes at least one arc-shaped recess, which is formed in the lower surface of the terminal plate 260c and connected to the third terminal hole 261. Preferably, the fixing unit 265c includes two arc-shaped recesses symmetrically formed in the lower surface of the terminal plate 260c about the third terminal hole 261 while being spaced apart from each other at an angle of 180°. The depth of the arc-shaped recess is within 50% of the thickness of the terminal plate 260c. A bottom surface of the arc-shaped recess forming the fixing unit 265c is inclined toward the third terminal hole 261 or is formed as a planar surface.

Figure 7:
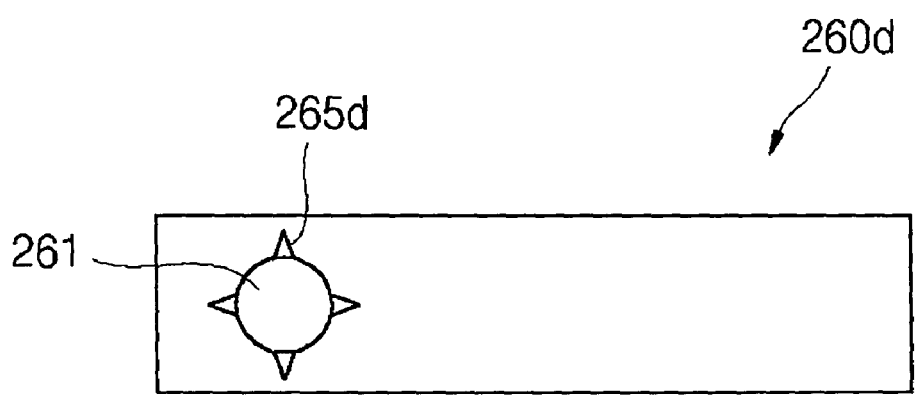
FIG. 7 is a bottom view of a terminal plate according to still yet another embodiment of the present invention.

FIG. 7 is a bottom view of a terminal plate according to still yet another embodiment of the present invention.

Referring to FIG. 7, the terminal plate 260d according to still yet another embodiment of the present invention has a fixing unit 265d connected to the third terminal hole 261. According to the present embodiment, the fixing unit 265d includes four recesses, which are formed in the lower surface of the terminal plate 260d and connected to the third terminal hole 261 while being spaced apart from each other at an angle of 90° about the third terminal hole 261. Preferably, the fixing unit 265d includes four triangular recesses formed in the lower surface of the terminal plate 260d. As the number of the triangular recesses increases, the mating force between the electrode terminal 230 and the terminal plate 260d increases, so the terminal plate 260d can be effectively fixed to the electrode terminal 230.

Figure 8A:
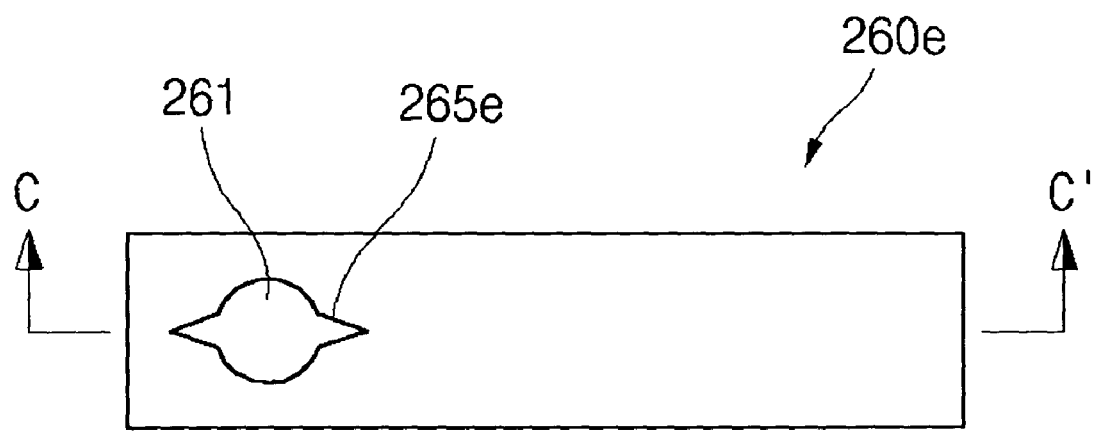
FIG. 8a is a bottom view of a terminal plate according to still yet another embodiment of the present invention.
Figure 8B:
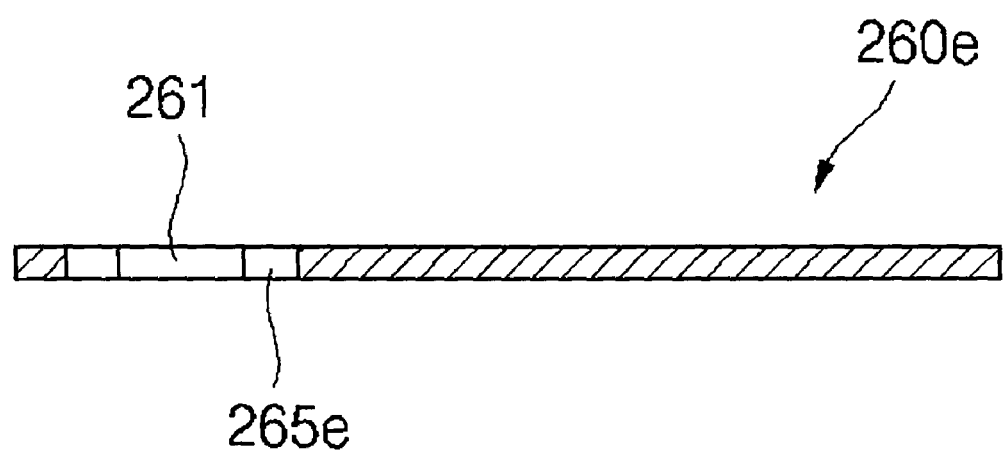

FIGS. 8a and 8b are respectively bottom and sectionals views of a terminal plate according to still yet another embodiment of the present invention.

Referring to FIGS. 8a and 8b, the terminal plate 260e according to still yet another embodiment of the present invention has a fixing unit 265e connected to the third terminal hole 261. In more detail, the fixing unit 265e includes at least one hole. Preferably the fixing unit 265e includes two holes, which are formed in the lower surface of the terminal plate 260e and connected to the third terminal hole 261. If the fixing unit 265e is a hole, the fixing unit 265e more securely fixes the terminal plate 260e to the electrode terminal 230 as compared with when the fixing unit is a recess, so that it is possible to effectively fix the terminal plate 260e with a reduced number of holes. In addition, if the number of holes forming the fixing unit 265e increases, it is difficult to fill all of the holes of the fixing unit 265e with the deformation part of the electrode terminal 230. Preferably, the fixing unit 265e includes a triangular hole connected to the third terminal hole 261 of the terminal plate 260e. Although the present invention does not limit the size of the hole, if the hole is too large, then the deformation part of the electrode terminal 230 can not completely fill the hole during the riveting process, thereby reducing the strength of the terminal plate 260e. When the fixing unit 265e is a hole, the deformation part of the electrode terminal 230 formed at the lower end of the electrode terminal 230 can be introduced into the upper portion of the hole during the riveting process, thereby causing damage to the insulating plate 250 mounted on the upper surface of the terminal plate 230. For this reason, the riveting process for the electrode terminal 230 must be cautiously performed while gradually increasing pressure applied to the electrode terminal 230. In addition, the hole of the fixing unit 265e can be formed in the lower surface of the terminal plate 260e with a rectangular sectional shape or an arcuate sectional shape.

The terminal plate according to the present invention can be provided with the fixing unit including recesses having various sectional shapes in addition to the above triangular, rectangular, arcuate sectional shapes. The recesses can be aligned while forming various intervals therebetween. The present invention does not limit the shapes and intervals of the recesses of the fixing unit. Preferably, if the fixing unit includes a plurality of recesses, an interval between the recesses is uniformly formed. For instance, if the fixing unit 265 includes three triangular recesses or three rectangular recesses, an interval between adjacent recesses is 120°.

In addition, the terminal plate according to the present invention can be provided with the fixing unit including holes having various shapes in addition to the above triangular, rectangular, arcuate sectional shapes. The holes can be aligned while forming various intervals therebetween. The present invention does not limit the shapes and intervals of the holes of the fixing unit.

Hereinafter, an operation of the lithium secondary battery including the terminal plate according to the present invention is described as follows.

Figure 9:
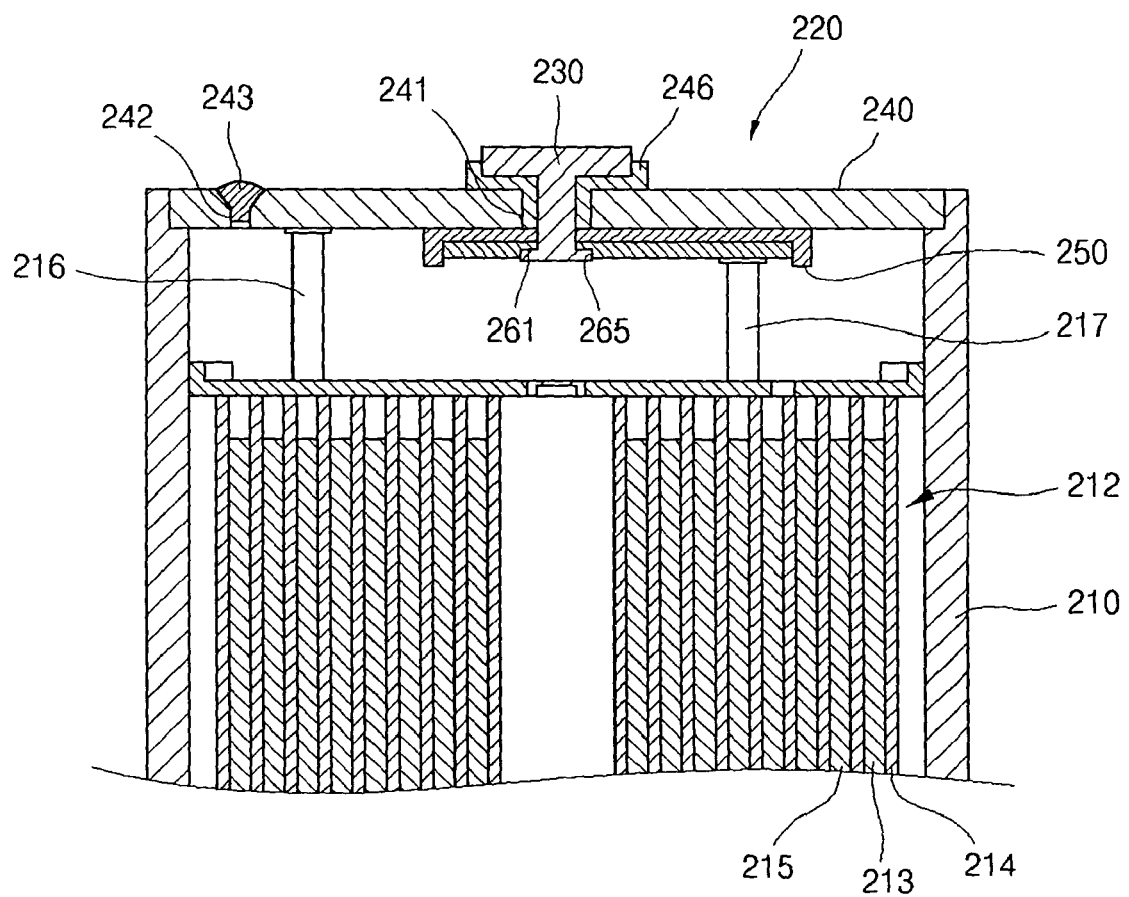
FIG. 9 is a partial sectional view of a lithium secondary battery equipped with a terminal plate having a fixing unit according to one embodiment of the present invention.

FIG. 9 is a partial sectional view of a lithium secondary battery equipped with a terminal plate having a fixing unit according to one embodiment of the present invention.

Referring to FIG. 9, the lithium secondary battery includes a fixing unit 265 in the form of a recess connected to the third terminal hole 261 of the terminal plate 260 provided at a lower portion of the cap assembly 220. Accordingly, when the riveting process is performed with respect to the electrode terminal 230 inserted into the third terminal hole 261, the end portion of the electrode terminal 230 is deformed and the recess 265 is filled with the deformed part of the electrode terminal 230. Thus, the terminal plate 260 can be fixedly attached to the electrode terminal 230 by the deformed part of the electrode terminal 230 accommodated within the recess 265. The electrode terminal 230 is press-fit into the second terminal hole 241 of the cap plate 240 together with the gasket tube 246. The electrode terminal 230 can be fixedly secured in the cap plate 240 while being insulated from the cap plate 240, so that the electrode terminal 230 is not rotated relative to the cap plate 240. Accordingly, the terminal plate 260 fixed to the electrode terminal 230 is also prevented from rotating when the terminal plate 260 is assembled with the cap assembly 220, when the first electrode tap 217 or the second electrode tap 216 is welded to the terminal plate 260 or when the terminal plate 260 is assembled with the upper portion of the can.

Figure 10:
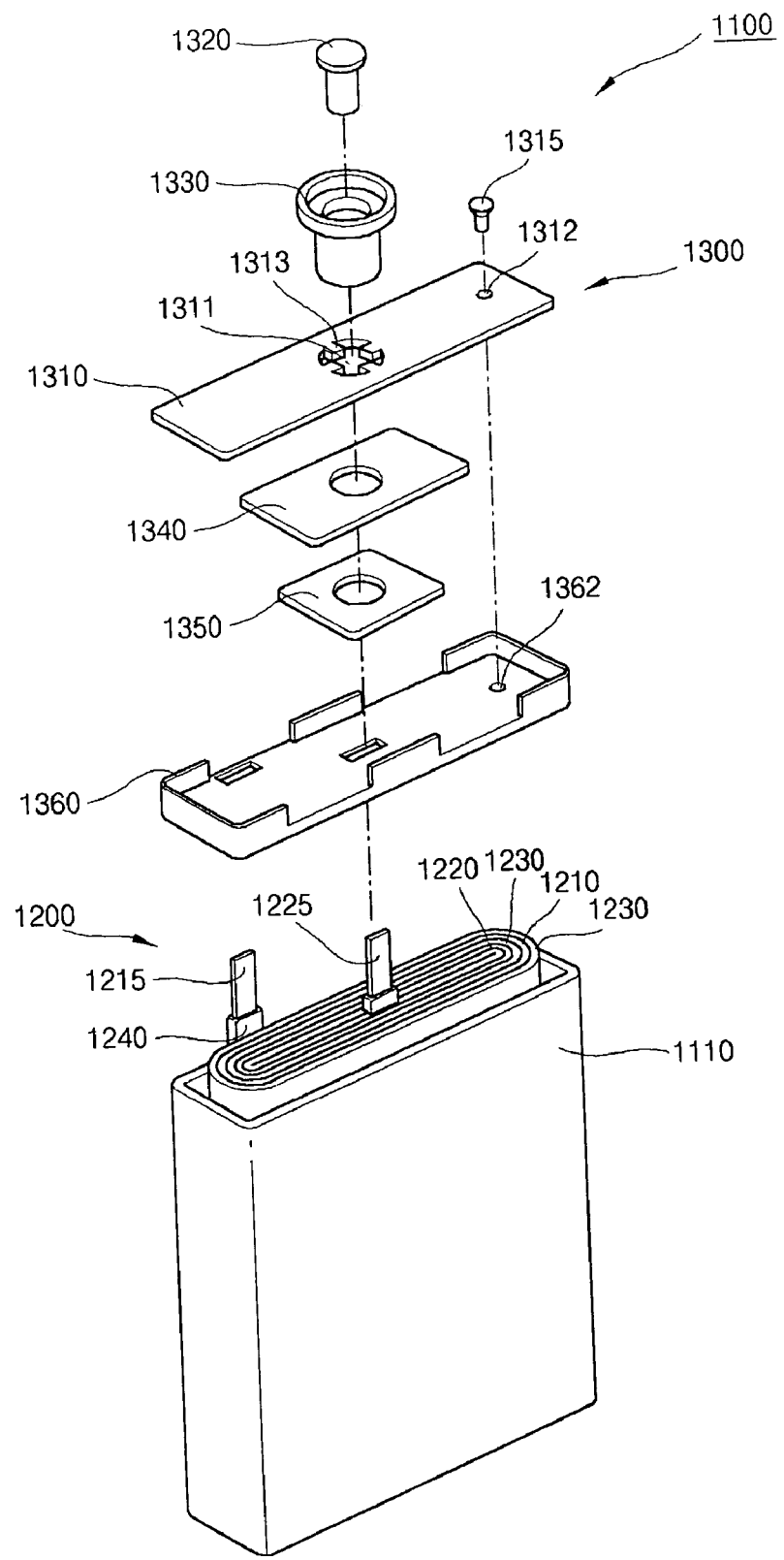
FIG. 10 is an exploded perspective view of a lithium secondary battery according to another embodiment of the present invention.

FIG. 10 is an exploded perspective view of a lithium secondary battery according to another embodiment of the present invention.

Referring to FIG. 10, the lithium secondary battery 1100 according to another embodiment of the present invention includes a case 1110, a jelly-roll electrode assembly 1200 accommodated in the case 1110, and a cap assembly 1300 assembled with an upper end portion of the case 1110.

The case 1110 is made of a metal having a rectangular shape and serves as a terminal.

The jelly-roll type electrode assembly 1200 accommodated in the case 1110 includes a first electrode plate 1210, to which one of a first electrode tap 1215 serving as a positive electrode tap and a second electrode tap 1225 serving as a negative electrode tap is attached, a second electrode plate 1220 to which the other of the first and second electrode taps 1215 and 1225 is attached, and a separator 1230 interposed between the first and second electrode plates 1210 and 1220. Preferably, the first electrode tap 1215 is attached to the first electrode plate 1210 and the second electrode tap 1225 is attached to the second electrode plate 1220. Insulating tapes 1240 are respectively provided at boundary areas between the first electrode tap 1215 and the electrode assembly 1200 and between the second electrode tap 1225 and the electrode assembly 1200, in order to prevent a short circuit between the first and second electrode plates 1210 and 1220.

The first and second electrode plates 1210 and 1220 have mutually different polarities. In addition, positive electrode active materials or negative electrode active materials are coated on at least one surface of the first and second electrode plates 1210 and 1220. A chalcogenide compound, such as $LiCoO_2$, $LiMn_2O_4$, $LiNiO_2$, $LiNi_{1-x}Co_xO_2$ ($0<x<1$), or $LiMn_2O_2$, can be used as positive electrode active materials.

In addition, carbon-based materials, such as, Si, Sn, tin oxides, composite tin alloys, transition metal oxides, lithium metal nitrides or lithium metal oxides, can be used as negative electrode active materials. In general, the positive electrode plate (that is, the first electrode plate 1210) is made of aluminum, the negative electrode plate (that is, the second electrode plate 1220) is made of copper, and the separator 1230 is made of polyethylene (PE) or polypropylene (PP). However, the present invention does not limit the materials for the above elements.

The cap assembly 1300 includes a cap plate 1310 made of a flat metal plate having a size and a shape corresponding to those of the upper opening of the case 1110. The cap plate 1310 has a terminal hole 1311 formed at the center thereof and an electrolyte injection hole 1312 formed on one side of the cap plate 1310 so as to inject the electrolyte into the case 1110. The electrolyte injection hole 1312 is sealed by a ball 1315. In addition, an anti-rotation unit 1313 in the form of a recess or a protrusion is provided on an outer peripheral portion of the terminal hole 1311 in order to prevent the electrode terminal 1230 from rotating.

The electrode terminal 1320 (for instance, a negative electrode terminal) is inserted into the terminal hole 1311. A tube type gasket 1330 surrounds the electrode terminal 1320 so as to electrically insulate the electrode terminal 1320 from the cap plate 1310. An insulating plate 1340 is provided below the cap plate 1310 and a terminal plate 1350 is provided below the insulating plate 1340. In addition, the lower portion of the electrode terminal 1320 is electrically connected to the terminal plate 1350 with the insulating plate 1340 is interposed between the electrode terminal 1320 and the terminal plate 1350.

The first electrode tap 1215 extending from the first electrode plate 1210 is welded to the lower surface of the cap plate 1310 and the second electrode tap 1225 extending from the second electrode plate 1220 is welded to the lower portion of the electrode terminal 1320.

An insulating case 1360 is installed on the upper surface of the electrode assembly 1200 so as to electrically insulate the electrode assembly 1200 from the cap assembly 1300 while covering the upper end portion of the electrode assembly 1200. The insulating case 1360 has an electrolyte hole 1362 corresponding to the electrolyte injection hole 1312 formed in the cap plate 1310 so that the electrolyte is introduced into the case 1110 by passing through the electrolyte injection hole 1312 and the electrolyte hole 1362. The insulating case 1360 is made of a polymer resin having an insulating property. Preferably, the insulating case 1360 is made of polypropylene (PP). However, the present invention does not limit the materials for the insulating case 1360.

Figure 11A:
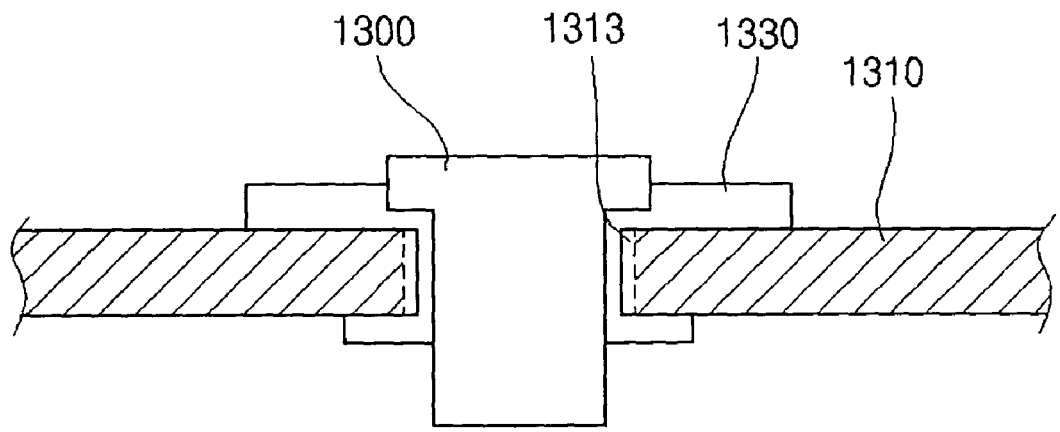
FIG. 11a is a sectional view of an assembled cap plate, electrode terminal and gasket in a cap assembly of a lithium secondary battery according to another embodiment of the present invention.
Figure 11B:
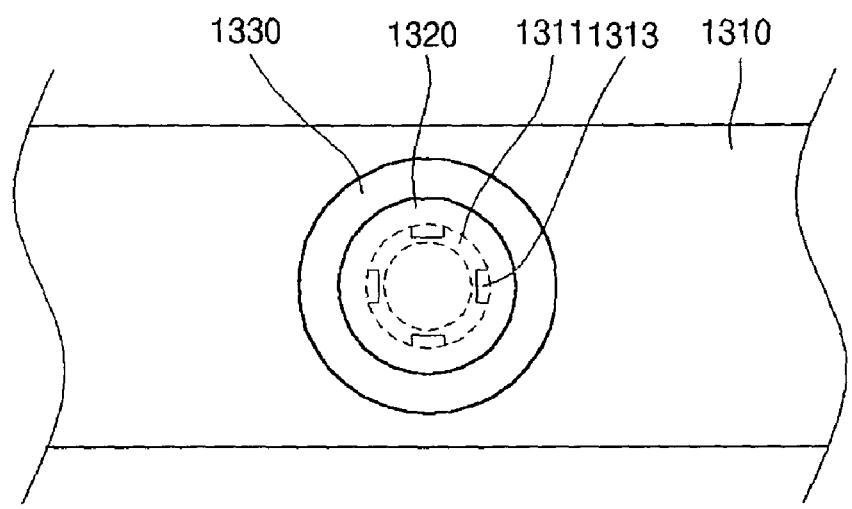
FIG. 11b is a plan view of an assembled cap plate, electrode terminal and gasket in a cap assembly of a lithium secondary battery according to another embodiment of the present invention.

FIG. 11a is a sectional view of an assembled the cap plate, the electrode terminal and the gasket in the cap assembly of the lithium secondary battery according to another embodiment of the present invention, and FIG. 11b is a plan view of the assembled cap plate, the electrode terminal and the gasket in the cap assembly of the lithium secondary battery according to another embodiment of the present invention.

Referring to FIGS. 11a and 11b, the electrode terminal 1320 surrounded by the gasket 1330 is inserted into the terminal hole 1311. The electrode terminal 1320 adheres to the gasket 1330 and the gasket 1330 is prevented from rotating due to the anti-rotation unit 1313 formed on an outer peripheral portion of the terminal hole 1311. Therefore, the electrode terminal 1320 is prevented from rotating when various processes are performed.

FIGS. 12a to 12f are perspective views of cap plates equipped with anti-rotation units of a lithium secondary battery according to another embodiment of the present invention.

Referring to FIGS. 12a to 12f, the cap plates 1310, 1310a, 1310b, 1310c, 1310d and 1310e of the lithium secondary battery 1100 according to another embodiment of the present invention respectively include anti-rotation units 1313, 1313a, 1313b, 1313c, 1313d and 1313e, for preventing the electrode terminal from rotating.

The anti-rotation units 1313, 1313a, 1313b, 1313c, 1313d and 1313e include at least one protrusion or recess respectively formed at the outer peripheral portions of the terminal holes 1311, 1311a, 1311b, 1311c, 1311d and 1311e for receiving the electrode terminal. The anti-rotation units 1313, 1313a, 1313b, 1313c, 1313d and 1313e prepared in the form of protrusions or recesses can have various sectional shapes, such as triangular, rectangular or semi-circular sectional shape. However, the present invention does not limit the shape of the anti-rotation units.

Figure 12A:
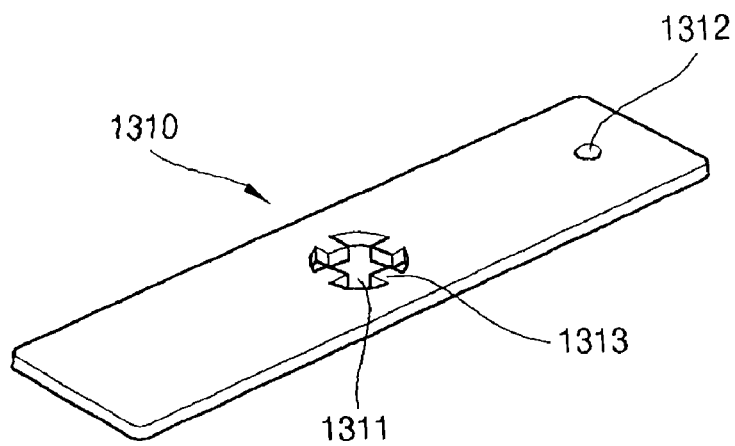
FIGS. 12a to 12f are perspective views of cap plates equipped with anti-rotation units of a lithium secondary battery according to another embodiment of the present invention.
Figure 12B:
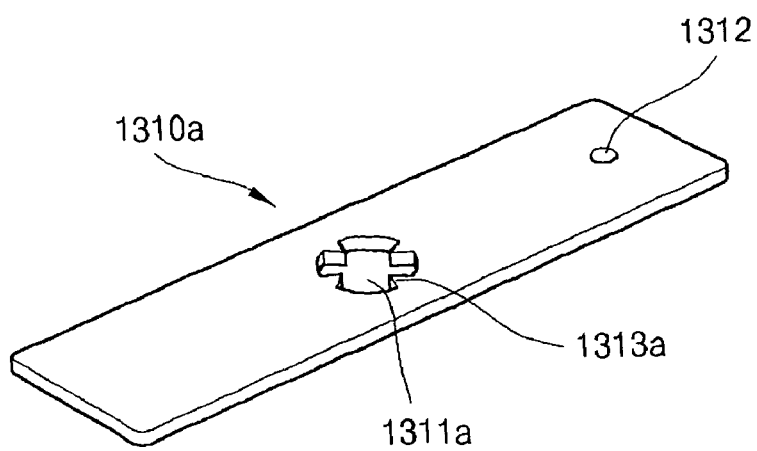
Figure 12C:
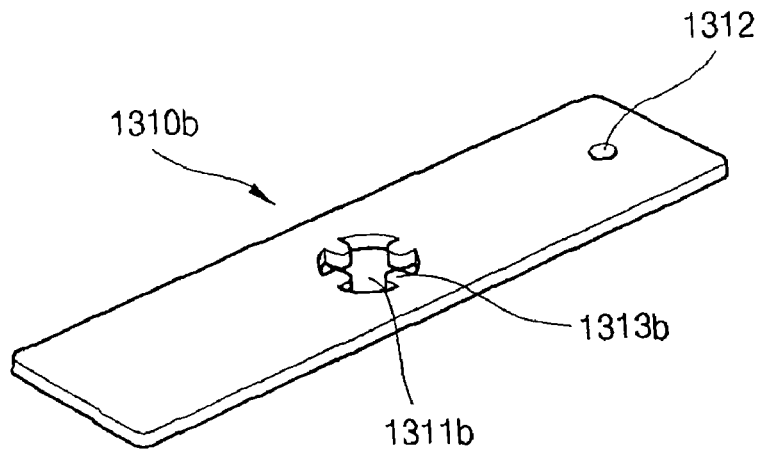

For instance, as shown in FIGS. 12a to 12c, the anti-rotation units 1313, 1313a and 1313b can be formed as protrusions, which respectively protrude radially inward from sidewalls of the terminal holes 1311, 1311a and 1311b. The sectional shape of the protrusions of the anti-rotation units 1313, 1313a and 1313b is one of a rectangular shape (see, FIG. 12a), a triangular shape (see, FIG. 12b) or a semi-circular shape (see, FIG. 12c).

Preferably, the length of protrusions forming the anti-rotation units 1313, 1313a and 1313b is within 0.2 mm. If the length of the protrusion is larger than 0.2 mm, it is difficult to insert the electrode terminal 1320 surrounded by the gasket 1330 into the terminal holes 1311, 1311a and 1311b, respectively.

Figure 12D:
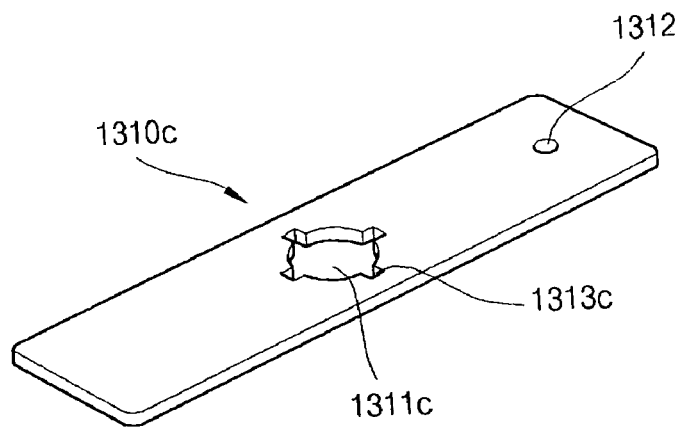
Figure 12E:
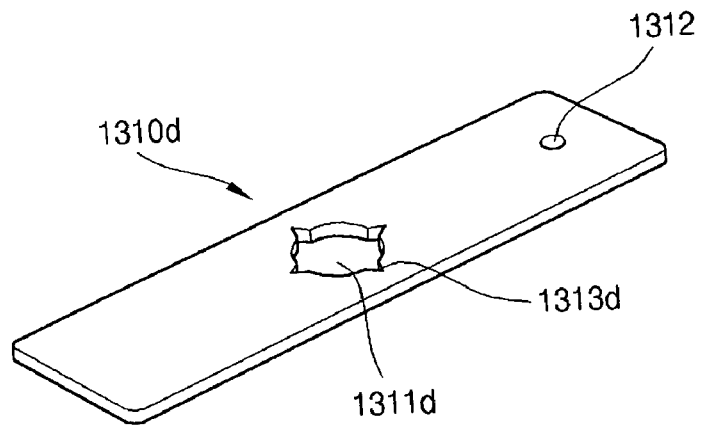
Figure 12F:
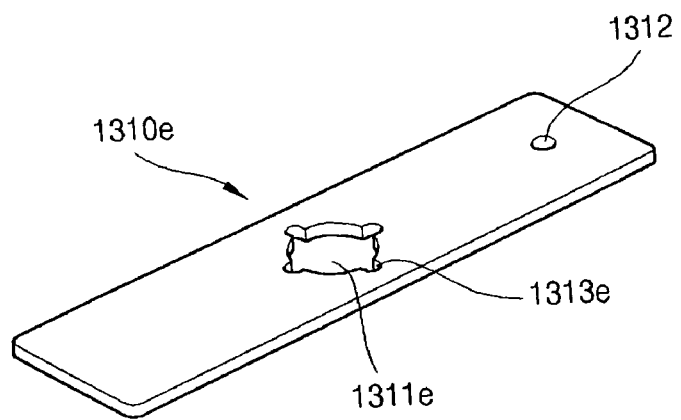

In addition, as shown in FIGS. 12d to 12f, the anti-rotation units 1313c, 1313d and 1313e can be formed as recesses, which are respectively formed radially outward from the terminal holes 1311c, 1311d and 1311e. The sectional shape of the recesses of the anti-rotation units 1313c, 1313d and 1313e is one of a rectangular shape (see, FIG. 12d), a triangular shape (see, FIG. 12e) or a semi-circular shape (see, FIG. 12f).

Preferably, the depth of recesses forming the anti-rotation units 1313c, 1313d and 1313e is within 0.2 mm. If the depth of the recess is greater than 0.2 mm, the gasket 1330 may not completely make contact with an edge portion of the recess, so that the electrolyte can leak from the lithium secondary battery.

As mentioned above, the lithium secondary battery 1100 having the above structure includes the cap plate 1310, 1310a, 1310b, 1310c, 1310d or 1310e provided with an anti-rotation unit 1313, 1313a, 1313b, 1313c, 1313d or 1313e, thereby preventing the electrode terminal 1320 from rotating during the fabrication process for the lithium secondary battery 1100.

Accordingly, a short circuit between the second electrode tap 1225 and the case 1110, caused by the rotation of the electrode terminal 1320, can be prevented.

Figure 13:
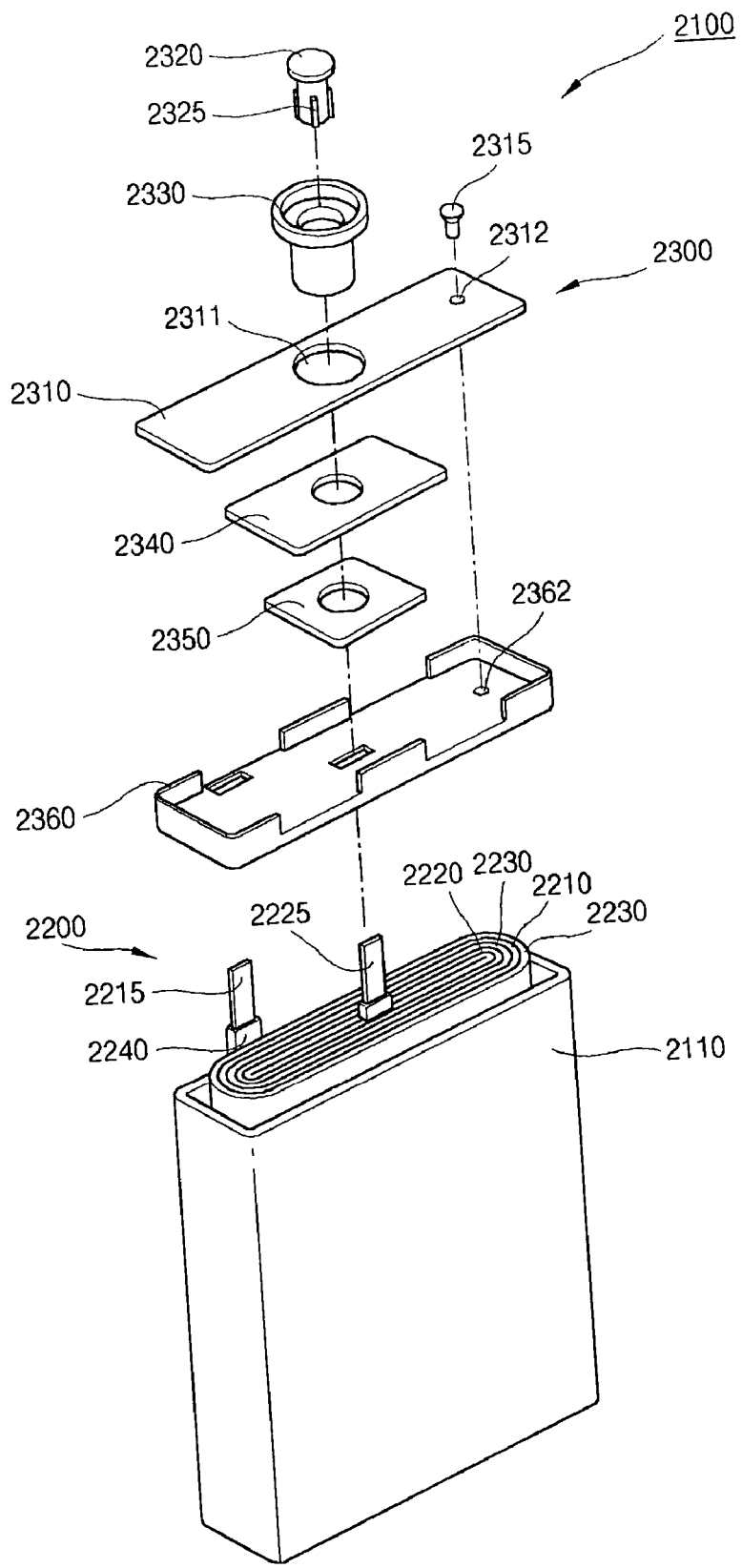
FIG. 13 is an exploded perspective view of a lithium secondary battery according to still another embodiment of the present invention.

FIG. 13 is an exploded perspective view of a lithium secondary battery according to still another embodiment of the present invention.

Referring to FIG. 13, the lithium secondary battery 2100 according to still another embodiment of the present invention includes a case 2110, a jelly-roll electrode assembly 2200 accommodated in the case 2110, and a cap assembly 2300 assembled with an upper end portion of the case 2110.

The case 2110 is made of a metal having a rectangular shape and serves as a terminal.

The jelly-roll electrode assembly 2200 accommodated in the case 2110 includes a first electrode plate 2210, to which one of a first electrode tap 2215 serving as a positive electrode tap and a second electrode tap 2225 serving as a negative electrode tap is attached, a second electrode plate 2220 to which the other of the first and second electrode taps 2215 and 2225 is attached, and a separator 2230 interposed between the first and second electrode plates 2210 and 2220. Preferably, the first electrode tap 2215 is attached to the first electrode plate 2210 and the second electrode tap 2225 is attached to the second electrode plate 2220. Insulating tapes 2240 are respectively provided at boundary areas between the first electrode tap 2215 and the electrode assembly 2200 and between the second electrode tap 2225 and the electrode assembly 2200, in order to prevent a short circuit between the first and second electrode plates 2210 and 2220.

The first and second electrode plates 2210 and 2220 have mutually different polarities. In addition, positive electrode active materials or negative electrode active materials are coated on at least one surface of the first and second electrode plates 2210 and 2220. A chalcogenide compound, such as $LiCoO_2$, $LiMn_2O_4$, $LiNiO_2$, $LiNi_{1-x}CO_xO_2$ ($0<x<1$), or $LiMn_2O_2$, can be used as a positive electrode active material. In addition, carbon-based materials, such as, Si, Sn, tin oxides, composite tin alloys, transition metal oxides, lithium metal nitrides or lithium metal oxides, can be used as negative electrode active materials. In general, the positive electrode plate (that is, the first electrode plate 2210) is made of aluminum, the negative electrode plate (that is, the second electrode plate 2220) is made of copper, and the separator 2230 is made of polyethylene (PE) or polypropylene (PP). However, the present invention does not limit the materials for the above elements.

The cap assembly 2300 includes a cap plate 2310 made of a flat metal plate having a size and a shape corresponding to those of the upper opening of the case 2110. The cap plate 2310 has a terminal hole 2311 formed at the center thereof and an electrolyte injection hole 2312 formed on one side of the cap plate 2310 so as to inject the electrolyte into the case 2110. The electrolyte injection hole 2312 is sealed by a ball 2315.

The electrode terminal 2320 (for instance, a negative electrode terminal) is inserted into the terminal hole 2311. In addition, at least one anti-rotation unit 2326 in the form of a recess or a protrusion is provided at an outer wall of the electrode terminal 2320 in order to prevent the electrode terminal 2320 from rotating during the fabrication process for the lithium secondary battery 2100. A tube type gasket 2330 surrounds the electrode terminal 2320 so as to electrically insulate the electrode terminal 2320 from the cap plate 2310. An insulating plate 2340 is provided below the cap plate 2310 and a terminal plate 2350 is provided below the insulating plate 2340. In addition, the lower portion of the electrode terminal 2320 is electrically connected to the terminal plate 2350 with the insulating plate 2340 interposed between the electrode terminal 2320 and the terminal plate 2350.

The first electrode tap 2215 extending from the first electrode plate 2210 is welded to the lower surface of the cap plate 2310 and the second electrode tap 2225 extending from the second electrode plate 2220 is welded to the lower portion of the electrode terminal 2320.

An insulating case 2360 is installed on the upper surface of the electrode assembly 2200 so as to electrically insulate the electrode assembly 2200 from the cap assembly 2300 while covering the upper end portion of the electrode assembly 2200. The insulating case 2360 has an electrolyte hole 2362 corresponding to the electrolyte injection hole 2312 formed in the cap plate 2310 so that the electrolyte is introduced into the case 2110 by passing through the electrolyte injection hole 2312 and the electrolyte hole 2362. The insulating case 2360 is made of a polymer resin having an insulating property. Preferably, the insulating case 2360 is made of polypropylene (PP). However, the present invention does not limit the materials for the insulating case 2360.

Figure 14A:
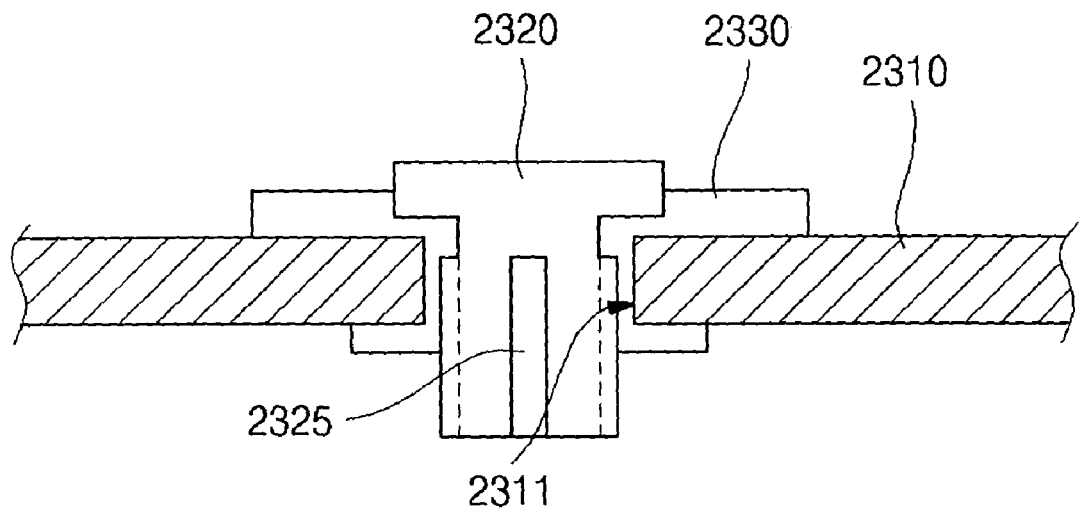
FIG. 14a is a sectional view of an assembled cap plate, electrode terminal and gasket in a cap assembly of a lithium secondary battery according to still another embodiment of the present invention.
Figure 14B:
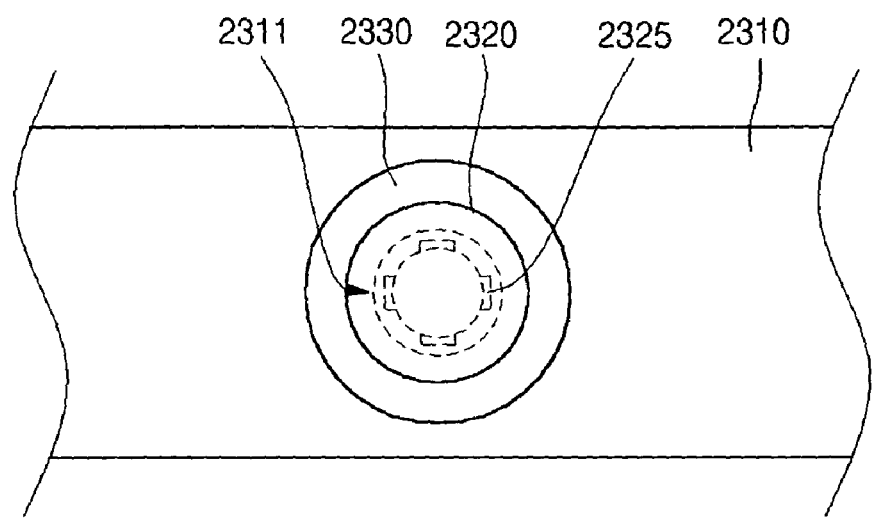
FIG. 14b is a plan view of an assembled cap plate, electrode terminal and gasket in a cap assembly of a lithium secondary battery according to still another embodiment of the present invention.

FIG. 14*a* is a sectional view of the assembled cap plate, electrode terminal and gasket in the cap assembly of the lithium secondary battery according to still another embodiment of the present invention, and FIG. 14*b* is a plan view of the assembled cap plate, electrode terminal and gasket in the cap assembly of the lithium secondary battery according to still another embodiment of the present invention.

Referring to FIGS. 14*a* and 14*b*, the electrode terminal 2320 surrounded by the gasket 2330 is inserted into the terminal hole 2311. The electrode terminal 2320 adheres to the gasket 2330 and the gasket 2330 is prevented from rotating due to the anti-rotation unit 2325 provided at the outer wall of the electrode terminal 2320. Therefore, the electrode terminal 2320 is prevented from rotating when various processes are performed.

FIGS. 15*a* to 15*f* are perspective views of cap plates equipped with anti-rotation units of a lithium secondary battery according to still another embodiment of the present invention.

Referring to FIGS. 15*a* to 15*f*, the electrode terminals 2320 to 2320*e* of the lithium secondary battery 2100 according to still another embodiment of the present invention respectively include anti-rotation units 2325 to 2325*e*.

The anti-rotation units 2325 to 2325*e* respectively include at least one protrusion or recess provided at the outer wall of the electrode terminals 2320 to 2320*e*. The anti-rotation unit, in the form of the protrusion or the recess, can have various shapes, such as a triangle, a rectangle or a semi-circular shape. However, the present invention does not limit the shapes of the anti-rotation units.

Figure 15A:
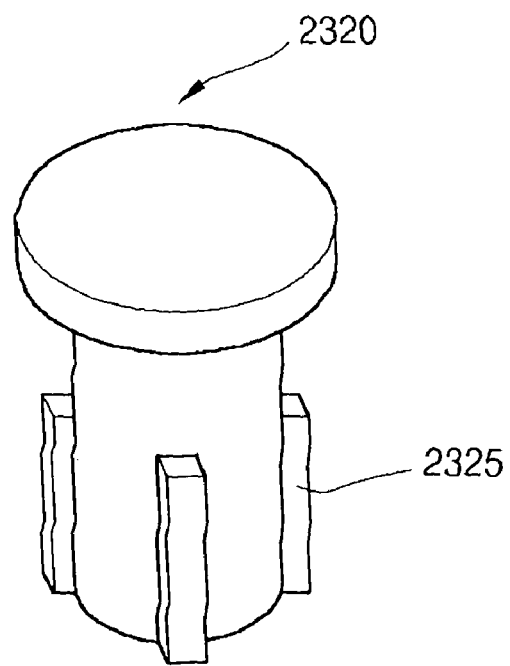
FIGS. 15a to 15f are perspective views of an electrode terminal equipped with an anti-rotation unit of a lithium secondary battery according to still another embodiment of the present invention.
Figure 15B:
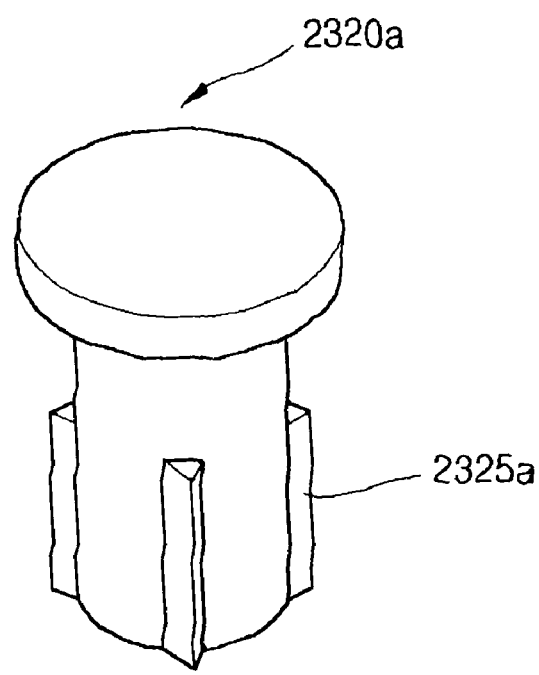
Figure 15C:
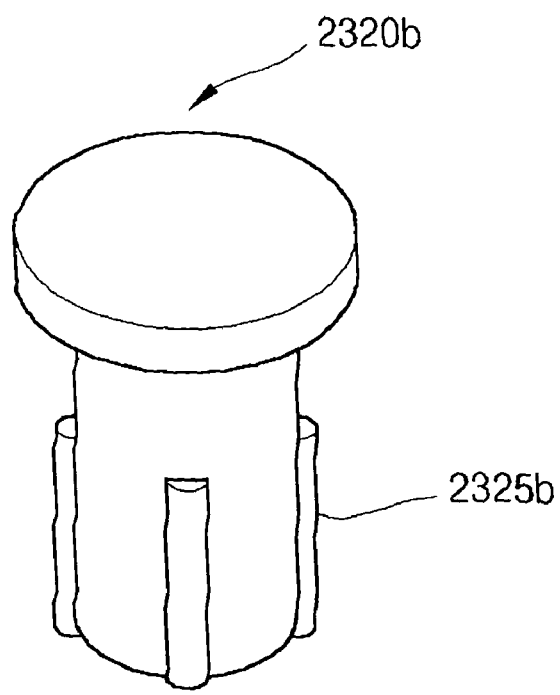

For instance, as shown in FIGS. 15*a* to 15*c*, the anti-rotation units 2325, 2325*a* and 2325*b* can be formed as protrusions, which are respectively formed at outer walls of the electrode terminals 2320, 2320*a* and 2320*b*. The sectional shape of the protrusions of the anti-rotation units 2325, 2325*a* and 2325*b* is one of a rectangular shape (see, FIG. 15*a*), a triangular shape (see, FIG. 15*b*) or a semi-circular shape (see, FIG. 15*c*).

Preferably, the length of protrusions forming the anti-rotation units 2325, 2325*a* and 2325*b* is within 0.2 mm. If the length of the protrusion is greater than 0.2 mm, it is difficult to insert the electrode terminal 2320 surrounded by the gasket 2330 into the respective terminal holes 2311, 2311*a* and 2311*b*.

Figure 15D:
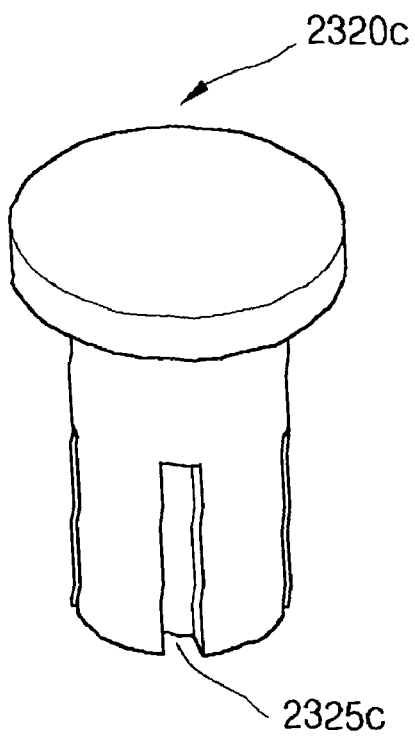
Figure 15E:
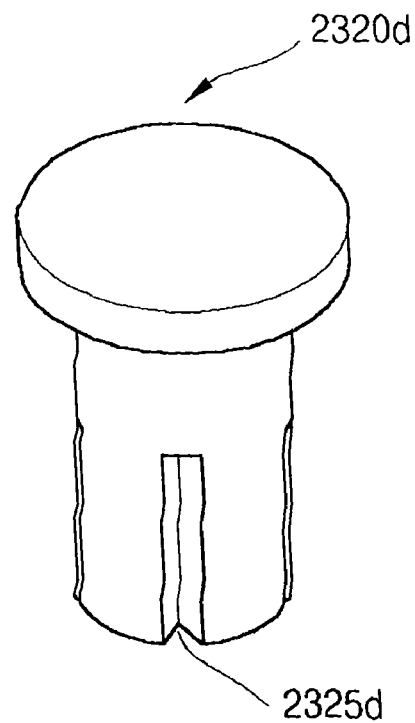
Figure 15F:
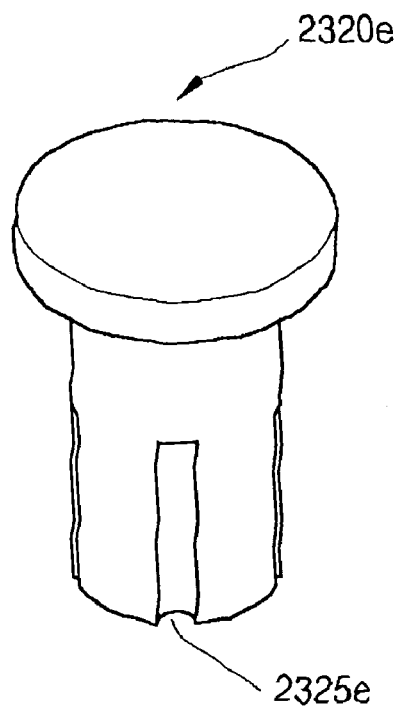

In addition, as shown in FIGS. 15*d* to 15*f*, the anti-rotation units 2325*c*, 2325*d* and 2325*e* can be formed as recesses, which are respectively formed in the outer walls of the electrode terminals 2320*c*, 2320*d* and 2320*e*. The sectional shape of the recesses of the anti-rotation units 2325*c*, 2325*d* and 2325*e* is one of a rectangular shape (see, FIG. 15*d*), a triangular shape (see, FIG. 15*e*) or a semi-circular shape (see, FIG. 15*f*).

Preferably, the depth of recesses forming the anti-rotation units 2325*c*, 2325*d* and 2325*e* is within 0.2 mm. If the depth of the recess is greater than 0.2 mm, the gasket 2330 may not completely make contact with an edge portion of the recess, so that the electrolyte can leak from the lithium secondary battery.

Figure 16A:
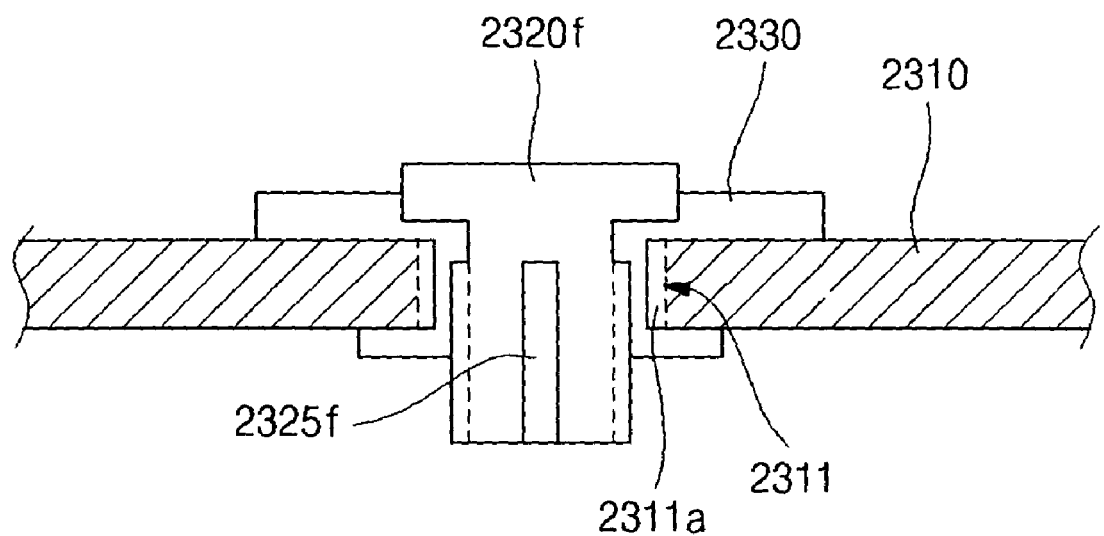
FIG. 16a is a sectional view of an assembled cap plate, electrode terminal and gasket in a cap assembly of a lithium secondary battery according to still yet another embodiment of the present invention.
Figure 16B:
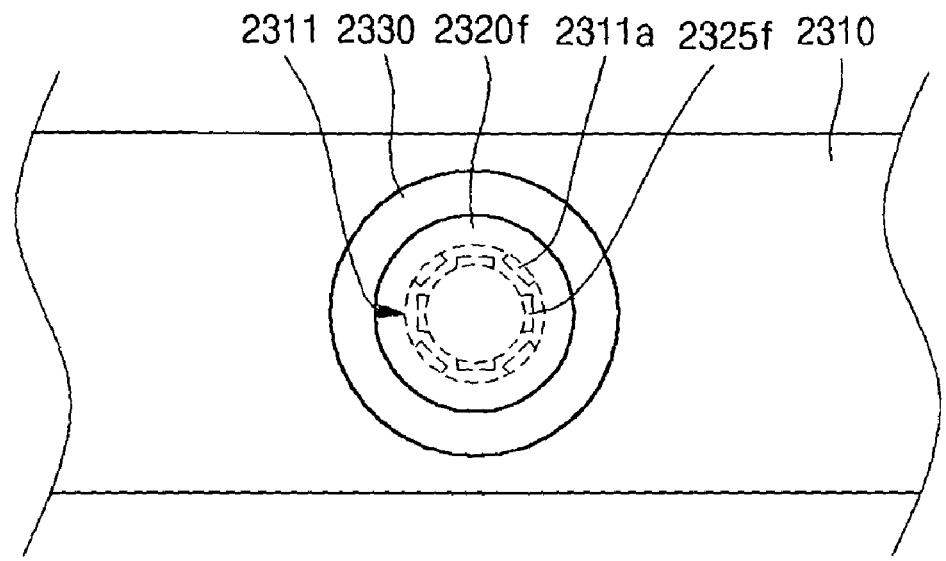
FIG. 16b is a plan view of an assembled cap plate, electrode terminal and gasket in a cap assembly of a lithium secondary battery according to still yet another embodiment of the present invention.

FIG. 16*a* is a sectional view of the assembled cap plate, electrode terminal and gasket in a cap assembly of a lithium secondary battery according to still yet another embodiment of the present invention and FIG. 16*b* is a plan view of the assembled cap plate, electrode terminal and gasket in the cap assembly of the lithium secondary battery according to still yet another embodiment of the present invention.

The lithium secondary battery of FIGS. 16*a* and 16*b* is similar to the lithium secondary battery shown in FIGS. 13, 14*a*, 14*b* and 15*a* to 15*f* except that anti-rotation units 2311*a* and 2325 are respectively provided in the cap plate 2310 and the electrode terminal 2320 of the cap assembly 2300.

That is, the cap assembly 2300 of the lithium secondary battery according to still another embodiment of the present invention includes the first anti-rotation unit 2311*a* formed at the outer peripheral portion of the terminal hole 2311 of the cap plate 2310 and the second anti-rotation unit 2325 formed at the outer wall of the electrode terminal 2320.

The first and second anti-rotation units 2311*a* and 2320 are protrusions or recesses provided at the outer peripheral portion of the terminal hole 2311 of the cap plate 2310 and at the outer wall of the electrode terminal 2320. The recesses or protrusions can have various sectional shapes, such as triangle, rectangle or semi-circular shape. The present invention does not limit the sectional shapes of the recesses or protrusions.

Preferably, the depth of recesses or the length of protrusions forming the anti-rotation units 2311*a* and 2325 is within 0.2 mm.

Although FIGS. 16*a* and 16*b* illustrate that the anti-rotation units 2311*a* and 2325 in the form of protrusions are respectively provided in the cap plate 2310 and the electrode terminal 2320, anti-rotation units 2311*a* and 2325 in the form of recesses can respectively be provided in the cap plate 2310 and the electrode terminal 2320.

In addition, one of the anti-rotation units 2311*a* and 2325 can be a protrusion and the other of the anti-rotation units 2311*a* and 2325 can be a recess.

As mentioned above, the lithium secondary battery of the present invention includes an electrode terminal having an anti-rotation unit, so that the electrode terminal can be prevented from rotating during the fabrication process for the lithium secondary battery.

In addition, the first and second anti-rotation units can be respectively provided at the outer peripheral portion of the terminal hole and at the outer wall of the electrode terminal, thereby preventing the electrode terminal from rotating.

Accordingly, a short circuit between the electrode tap and the case, caused by the rotation of the electrode terminal, can be prevented.

As described above, according to the lithium secondary battery of the present invention, the terminal plate is prevented from rotating when the positive electrode tap or the negative electrode tap is welded to the lower surface of the cap assembly.

In addition, according to the present invention, the terminal plate is prevented from rotating when the cap assembly is welded to the upper portion of the can.

Furthermore, according to the present invention, the anti-rotation unit is formed in the cap plate so that the electrode terminal can be prevented from rotating.

In addition, according to the present invention, the electrode terminal is provided with the anti-rotation unit so that the electrode terminal can be prevented from rotating.

Although exemplary embodiments of the present invention have been described for illustrative purposes, those skilled in the art will appreciate that various modifications, additions and substitutions are possible, without departing from the scope and spirit of the present invention as defined by the accompanying claims.

What is claimed is:

1. A lithium secondary battery, comprising:
   an electrode assembly including a first electrode plate, a second electrode plate and a separator;
   a can to receive the electrode assembly and an electrolyte; and
   a cap assembly including a cap plate, an insulating plate, a terminal plate and an electrode terminal including a head and a shank which is disposed to pass through the terminal plate, the cap assembly assembled over an upper opening of the can to seal the can;
   the terminal plate includes a terminal hole to receive the electrode terminal and a fixing unit and a protrusion on the shank of the electrode terminal on the opposite side of the head of the electrode terminal engaged with the fixing unit such that the electrode terminal can prevent the terminal plate from rotating,
   the fixing unit includes at least two recesses arranged on a lower surface of the terminal plate and connected to the terminal hole; and
   the at least two recesses of the fixing unit are inclined from the lower surface of the terminal plate toward the terminal hole.

2. The lithium secondary battery as claimed in claim 1, wherein the at least two recesses of the fixing unit have a triangular, rectangular or arcuate sectional shape.

3. The lithium secondary battery as claimed in claim 1, wherein a portion of the at least two recesses contacting the terminal hole have a depth of less than 50% of a thickness of the terminal plate.

4. The lithium secondary battery as claimed in claim 1, wherein the fixing unit includes two recesses spaced apart from each other by an angle of 180° about the terminal hole.

5. The lithium secondary battery as claimed in claim 1, wherein the fixing unit includes four recesses spaced apart from each other by an angle of 90° about the terminal hole.

6. The lithium secondary battery as claimed in claim 1, wherein the first electrode plate is a negative electrode plate, the second electrode plate is a positive electrode plate and the electrode terminal is a negative electrode terminal.

* * * * *